United States Patent
Hoshino et al.

(10) Patent No.: US 10,927,260 B2
(45) Date of Patent: Feb. 23, 2021

(54) COLORING COMPOSITION, LIGHT ABSORPTION ANISOTROPIC FILM, LAMINATE, AND IMAGE DISPLAY DEVICE

(71) Applicant: FUJIFILM Corporation, Tokyo (JP)

(72) Inventors: Wataru Hoshino, Minami-ashigara (JP); Masaki Ota, Minami-ashigara (JP); Masatoshi Mizumura, Minami-ashigara (JP); Takashi Katou, Minami-ashigara (JP); Yoshiaki Takada, Minami-ashigara (JP); Yoji Ito, Minami-ashigara (JP); Daisuke Kashiwagi, Minami-ashigara (JP); Yuya Hamaguchi, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 154 days.

(21) Appl. No.: 16/111,562

(22) Filed: Aug. 24, 2018

(65) Prior Publication Data

US 2018/0362768 A1 Dec. 20, 2018

Related U.S. Application Data

(63) Continuation of application No. PCT/JP2017/008071, filed on Mar. 1, 2017.

(30) Foreign Application Priority Data

Mar. 8, 2016 (JP) .............................. JP2016-044910
Apr. 4, 2016 (JP) .............................. JP2016-075385

(51) Int. Cl.

| | | |
|---|---|---|
| *C09B 62/475* | (2006.01) | |
| *G02F 1/1335* | (2006.01) | |
| *G02F 1/13363* | (2006.01) | |
| *G02B 5/30* | (2006.01) | |
| *G02B 5/22* | (2006.01) | |
| *C08F 20/34* | (2006.01) | |
| *G02F 1/1337* | (2006.01) | |
| *C09B 62/473* | (2006.01) | |
| *C08F 220/36* | (2006.01) | |

(52) U.S. Cl.
CPC ............ *C09B 62/475* (2013.01); *C08F 20/34* (2013.01); *G02B 5/223* (2013.01); *G02B 5/3033* (2013.01); *G02B 5/3083* (2013.01); *G02F 1/13363* (2013.01); *G02F 1/133514* (2013.01); *G02F 1/133528* (2013.01); *C08F 220/365* (2020.02); *C09B 62/473* (2013.01); *C09K 2323/031* (2020.08); *G02F 1/133723* (2013.01); *G02F 2001/133638* (2013.01)

(58) Field of Classification Search
CPC ... C09B 31/043; C09B 62/473; C09B 62/475; G02B 5/223; G02B 5/3033; G02B 5/3083; G02F 1/133514; G02F 1/133528; G02F 1/13363; G02F 2001/133638; C08F 20/34; C08F 220/365; Y10T 428/1041; C09K 2323/031

See application file for complete search history.

(56) References Cited

U.S. PATENT DOCUMENTS

| | | | | |
|---|---|---|---|---|
| 4,959,172 A | * | 9/1990 | Miura ..................... | C09B 31/04 252/299.1 |
| 2007/0206282 A1 | * | 9/2007 | Miyatake ............ | C09K 19/3852 359/487.02 |
| 2010/0134726 A1 | * | 6/2010 | Morishima ............ | C09K 19/22 349/97 |
| 2011/0177315 A1 | * | 7/2011 | Iwahashi ................ | C09B 31/04 428/220 |

FOREIGN PATENT DOCUMENTS

| | | |
|---|---|---|
| JP | 2011-48311 A | 3/2011 |
| JP | 2011-237513 A | 11/2011 |
| JP | 2013-139521 A | 7/2013 |
| JP | 2013-210624 A | 10/2013 |
| JP | 2013-227531 A | 11/2013 |

(Continued)

OTHER PUBLICATIONS

International Preliminary Report on Patentability and Written Opinion of the International Searching Authority (Forms PCT/IB/326, PCT/IB/373 and PCT/ISA/237) for International Application No. PCT/JP2017/008071, dated Sep. 20, 2018, with English translation.

(Continued)

*Primary Examiner* — Sophie Hon

(74) *Attorney, Agent, or Firm* — Birch, Stewart, Kolasch & Birch, LLP

(57) ABSTRACT

Provided are a coloring composition with which a light absorption anisotropic film having excellent durability can be formed, a light absorption anisotropic film, a laminate, and an image display device. A coloring composition according to the invention contains a dichroic dye compound having a structure represented by Formula (1D) and a liquid crystalline compound.

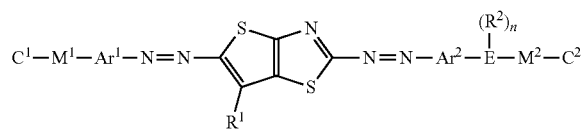

(1D)

14 Claims, No Drawings

(56) References Cited

FOREIGN PATENT DOCUMENTS

| | | |
|---|---|---|
| JP | 2016-4055 A | 1/2016 |
| WO | WO 2010/038817 A1 | 4/2010 |
| WO | WO 2010/038818 A1 | 4/2010 |
| WO | WO 2011/024890 A1 | 3/2011 |

OTHER PUBLICATIONS

International Search Report (Form PCT/ISA/210) for International Application No. PCT/JP2017/008071, dated Apr. 4, 2017, with English translation.
Japanese Office Action, dated Jun. 11, 2019, for corresponding Japanese Application No. 2018-504406, with an English machine translation.

* cited by examiner

COLORING COMPOSITION, LIGHT ABSORPTION ANISOTROPIC FILM, LAMINATE, AND IMAGE DISPLAY DEVICE

CROSS-REFERENCE TO RELATED APPLICATIONS

This application is a Continuation of PCT International Application No. PCT/JP2017/008071 filed on Mar. 1, 2017, which claims priority under 35 U.S.C. § 119(a) to Japanese Patent Application No. 2016-044910 filed on Mar. 8, 2016 and Japanese Patent Application No. 2016-075385 filed on Apr. 4, 2016. Each of the above applications is hereby expressly incorporated by reference, in its entirety, into the present application.

BACKGROUND OF THE INVENTION

1. Field of the Invention

The present invention relates to a coloring composition, a light absorption anisotropic film, a laminate, and an image display device.

2. Description of the Related Art

In a case where an attenuation function, a polarization function, a scattering function, or a shielding function is required in relation to irradiated light including laser light and natural light, a device which is operated by a different principle for each function has been used. Therefore, products corresponding to the above-described functions have also been manufactured through a different manufacturing process for each function.

For example, in liquid crystal displays (LCDs), a linearly polarizing plate or a circularly polarizing plate is used to control optical activity or a birefringent property in display. In addition, in organic light emitting diodes (OLEDs), a circularly polarizing plate is also used to prevent external light from being reflected.

Iodine has been widely used as a dichroic substance in these polarizing plates (polarizing elements). However, a polarizing element using an organic dye as a dichroic substance instead of iodine has also been examined.

In recent years, a dichroic dye having a higher alignment degree has been required with increasing performance of polarizing elements. As a dichroic dye exhibiting such a high alignment degree, for example, JP2011-237513A discloses a dichroic dye having a thienothiazole azo structure (paragraph 0134 or the like).

SUMMARY OF THE INVENTION

The inventors have examined a light absorption anisotropic film which is obtained using a coloring composition containing a dichroic dye compound having a thienothiazole azo structure described in JP2011-237513A, and found that the dichroic dye compound is not sufficiently fixed in the light absorption anisotropic film depending on the kind of the dichroic dye compound having a thienothiazole azo structure. In a case where the dichroic dye compound is not sufficiently fixed, the curability of the coloring composition may be reduced, and thus the durability of the light absorption anisotropic film may deteriorate.

Accordingly, an object of the invention is to provide a coloring composition with which a light absorption anisotropic film having excellent durability can be formed, a light absorption anisotropic film, a laminate, and an image display device.

The inventors have conducted intensive studies regarding the above-described object, and as a result, found that in a case where a dichroic dye compound having a thienothiazole azo structure has a crosslinkable group at at least one terminal and has a group having a predetermined number or more of atoms, the coloring composition has good curability, and thus the durability of a light absorption anisotropic film is improved, and completed the invention.

That is, the inventors have found that the object can be achieved with the following configuration.

[1] A coloring composition comprising: a dichroic dye compound having a structure represented by Formula (1D) to be described later; and a liquid crystalline compound.

In Formula (1D) to be described later, $C^1$ and $C^2$ each independently represent a monovalent substituent. At least one of $C^1$ or $C^2$ represents a crosslinkable group.

In Formula (1D) to be described later, $M^1$ and $M^2$ each independently represent a divalent linking group. In at least one of $M^1$ or $M^2$, the number of atoms of a main chain is 4 or more.

In Formula (1D) to be described later, $Ar^1$ and $Ar^2$ each independently represent any one of a phenylene group which may have a substituent, a naphthylene group which may have a substituent, and a biphenylene group which may have a substituent.

In Formula (1D) to be described later, E represents any one of a nitrogen atom, an oxygen atom, and a sulfur atom.

In Formula (1D) to be described later, $R^1$ represents a hydrogen atom or a substituent.

In Formula (1D) to be described later, $R^2$ represents a hydrogen atom or an alkyl group which may have a substituent.

In Formula (1D) to be described later, n represents 0 or 1. In a case where E is a nitrogen atom, n is 1, and in a case where E is an oxygen atom or a sulfur atom, n is 0.

In Formula (1D) to be described later, at least one of the following Condition 1 or Condition 2 is satisfied.

Condition 1: $C^1$ is a crosslinkable group, and the number of atoms of a main chain of $M^1$ is 4 or more.

Condition 2: $C^2$ is a crosslinkable group, and the number of atoms of a main chain of $M^2$ is 4 or more.

[2] The coloring composition according to [1], in which in Formula (1D) to be described later, the number of atoms of a main chain of at least one of $M^1$ or $M^2$ is 7 or more.

[3] The coloring composition according to [1] or [2], in which in Formula (1D) to be described later, both $C^1$ and $C^2$ are crosslinkable groups.

[4] The coloring composition according to any one of [1] to [3], in which the crosslinkable group is an acryloyl group or a methacryloyl group.

[5] A light absorption anisotropic film which is formed using the coloring composition according to any one of [1] to [4].

[6] A laminate comprising: a base; and the light absorption anisotropic film according to [5] which is formed on the base.

[7] The laminate according to [6], further comprising: a λ/4 plate which is formed on the light absorption anisotropic film.

[8] The laminate according to [6], further comprising: an oxygen shielding layer which is formed on the light absorption anisotropic film.

[9] An image display device comprising: the light absorption anisotropic film according to [5]; or the laminate according to any one of [6] to [8].

As will be described later, according to the invention, it is possible to provide a coloring composition with which a light absorption anisotropic film having excellent durability can be formed, a light absorption anisotropic film, a laminate, and an image display device.

DESCRIPTION OF THE PREFERRED EMBODIMENTS

Hereinafter, the invention will be described in detail.

The following description of constituent requirements is based on typical embodiments of the invention, but the invention is not limited thereto.

In the invention, a numerical value range expressed using "to" means a range including numerical values before and after "to" as a lower limit value and an upper limit value.

[Coloring Composition]

A coloring composition according to the invention contains a dichroic dye compound having a structure represented by Formula (1D) to be described later and a liquid crystalline compound.

According to the coloring composition of the invention, a light absorption anisotropic film having excellent durability can be formed in a case where the coloring composition has a dichroic dye compound having a structure represented by Formula (1D) to be described later. Here, the dichroic dye compound having a structure represented by Formula (1D) to be described later has a thienothiazole azo structure. In addition, the number of atoms of a main chain of at least one of $M^1$ or $M^2$ in Formula (1D) is 4 or more, and at least one of $C^1$ or $C^2$ is a crosslinkable group.

Details of the reason why the above-described excellent effect is obtained by the dichroic dye compound having a structure represented by Formula (1D) (hereinafter, also referred to as "specific dichroic dye compound") are not yet clear, but presumed as follows.

A dye having a thienothiazole azo structure (hereinafter, also simply referred to as "thienothiazole azo dye") has an extremely high alignment degree of 0.8 or higher. The thienothiazole azo dye is thought to be aligned in a state close to a crystalline state in consideration of the fact that the alignment degree of a single crystal is 1.0.

In a state in which the dye has a state close to a crystalline state, in a case where the thienothiazole azo dye has a crosslinkable group (polymerizable group), crosslinkable groups in a light absorption anisotropic film are unlikely to be disposed close to each other, and thus it is thought that the polymerization of the thienothiazole azo dye may not proceed.

In addition, the thienothiazole skeleton itself has a property of inhibiting the polymerization. Accordingly, in a case where the distance between a core portion and a crosslinkable group of the thienothiazole azo dye is short, the core portion of the thienothiazole azo dye traps active species, and thus it is thought that the polymerization of the thienothiazole azo dye may not proceed.

However, in a case where the thienothiazole azo dye has a crosslinkable group ($C^1$ or $C^2$ in Formula (1D)) at an end of a long linking group ($M^1$ or $M^2$ in which the number of atoms of a main chain in Formula (1D) is 4 or more), the linking group partially has flexibility, and thus the polymerization of the thienothiazole azo dye is presumed to easily proceed due to reasons, such as the fact that crosslinkable groups can approach each other even in a state in which the core portion of the thienothiazole azo dye has a state close to a crystalline state, and the fact that active species are hardly trapped due to a long distance between the core portion and the crosslinkable group of the thienothiazole azo dye. Accordingly, it is presumed that the specific dichroic dye compound is sufficiently fixed in a light absorption anisotropic film, and thus the curability of the coloring composition is improved, and the light absorption anisotropic film has excellent durability.

Hereinafter, components contained in the coloring composition according to the invention and components which can be contained will be described.

<Dichroic Dye Compound>

The coloring composition according to the invention contains a dichroic dye compound (specific dichroic dye compound) having a structure represented by Formula (1D).

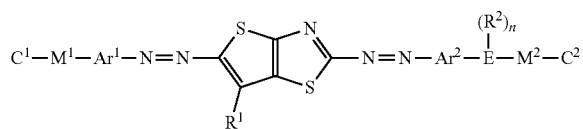

(1D)

In Formula (1D), $C^1$ and $C^2$ each independently represent a monovalent substituent. At least one of $C^1$ or $C^2$ represents a crosslinkable group.

In Formula (1D), $M^1$ and $M^2$ each independently represent a divalent linking group. In at least one of $M^1$ or $M^2$, the number of atoms of a main chain is 4 or more.

In Formula (1D), $Ar^1$ and $Ar^2$ each independently represent any one of a phenylene group which may have a substituent, a naphthylene group which may have a substituent, and a biphenylene group which may have a substituent.

In Formula (1D), E represents any one of a nitrogen atom, an oxygen atom, and a sulfur atom.

In Formula (1D), $R^1$ represents a hydrogen atom or a substituent.

In Formula (1D), $R^2$ represents a hydrogen atom or an alkyl group which may have a substituent.

In Formula (1D), n represents 0 or 1. In a case where E is a nitrogen atom, n is 1, and in a case where E is an oxygen atom or a sulfur atom, n is 0.

In Formula (1D), at least one of the following Condition 1 or Condition 2 is satisfied.

Condition 1: $C^1$ is a crosslinkable group, and the number of atoms of a main chain of $M^1$ is 4 or more.

Condition 2: $C^2$ is a crosslinkable group, and the number of atoms of a main chain of $M^2$ is 4 or more.

In Formula (1D), the monovalent substituent represented by $C^1$ or $C^2$ will be described.

As the monovalent substituent represented by $C^1$ or $C^2$, a group which is introduced to increase the nematic liquid crystallinity or the solubility of an azo compound, an electron-donating or electron-withdrawing group which is introduced to adjust a tone as a dye, or a crosslinkable group (polymerizable group) which is introduced to fix the alignment is preferable.

Examples of the substituent include an alkyl group (preferably having 1 to 20 carbon atoms, more preferably 1 to 12 carbon atoms, and particularly preferably 1 to 8 carbon atoms, exemplified by a methyl group, an ethyl group, an isopropyl group, a tert-butyl group, an n-octyl group, an n-decyl group, an n-hexadecyl group, a cyclopropyl group, a cyclopentyl group, and a cyclohexyl group), an alkenyl group (preferably having 2 to 20 carbon atoms, more preferably 2 to 12 carbon atoms, and particularly preferably 2 to 8 carbon atoms, exemplified by a vinyl group, an allyl group, a 2-butenyl group, and a 3-pentenyl group), an alkynyl group (preferably having 2 to 20 carbon atoms, more preferably 2 to 12 carbon atoms, and particularly preferably 2 to 8 carbon atoms, exemplified by a propargyl group and a 3-pentynyl group), an aryl group (preferably having 6 to 30 carbon atoms, more preferably 6 to 20 carbon atoms, and particularly preferably 6 to 12 carbon atoms, exemplified by a phenyl group, a 2,6-diethylphenyl group, a 3,5-ditrifluoromethylphenyl group, a styryl group, a naphthyl group, and a biphenyl group), a substituted or unsubstituted amino group (preferably having 0 to 20 carbon atoms, more preferably 0 to 10 carbon atoms, and particularly preferably 0 to 6 carbon atoms, exemplified by an unsubstituted amino group, a methylamino group, a dimethylamino group, a diethylamino group, and an anilino group), an alkoxy group (preferably having 1 to 20 carbon atoms, and more preferably 1 to 15 carbon atoms, exemplified by a methoxy group, an ethoxy group, and a butoxy group), an oxycarbonyl group (preferably having 2 to 20 carbon atoms, more preferably 2 to 15 carbon atoms, and particularly preferably 2 to 10 carbon atoms, exemplified by a methoxycarbonyl group, an ethoxycarbonyl group, and a phenoxycarbonyl group), an acyloxy group (preferably having 2 to 20, more preferably 2 to 10 carbon atoms, and particularly preferably 2 to 6 carbon atoms, exemplified by an acetoxy group, a benzoyloxy group, an acryloyl group, and a methacryloyl group), an acylamino group (preferably having 2 to 20 carbon atoms, more preferably 2 to 10 carbon atoms, and particularly preferably 2 to 6 carbon atoms, exemplified by an acetylamino group and a benzoylamino group), an alkoxycarbonylamino group (preferably having 2 to 20 carbon atoms, more preferably 2 to 10 carbon atoms, and particularly preferably 2 to 6 carbon atoms, exemplified by a methoxycarbonylamino group), an aryloxycarbonylamino group (preferably having 7 to 20 carbon atoms, more preferably 7 to 16 carbon atoms, and particularly preferably 7 to 12 carbon atoms, exemplified by a phenyloxycarbonylamino group), a sulfonylamino group (preferably having 1 to 20 carbon atoms, more preferably 1 to 10 carbon atoms, and particularly preferably 1 to 6 carbon atoms, exemplified by a methanesulfonylamino group and a benzenesulfonylamino group), a sulfamoyl group (preferably having 0 to 20 carbon atoms, more preferably 0 to 10 carbon atoms, and particularly preferably 0 to 6 carbon atoms, exemplified by a sulfamoyl group, a methylsulfamoyl group, a dimethylsulfamoyl group, and a phenylsulfamoyl group), a carbamoyl group (preferably having 1 to 20 carbon atoms, more preferably 1 to 10 carbon atoms, and particularly preferably 1 to 6 carbon atoms, exemplified by an unsubstituted carbamoyl group, a methylcarbamoyl group, a diethylcarbamoyl group, and a phenylcarbamoyl group), an alkylthio group (preferably having 1 to 20 carbon atoms, more preferably 1 to 10 carbon atoms, and particularly preferably 1 to 6 carbon atoms, exemplified by a methylthio group and an ethylthio group), an arylthio group (preferably having 6 to 20 carbon atoms, more preferably 6 to 16 carbon atoms, and particularly preferably 6 to 12 carbon atoms, exemplified by a phenylthio group), a sulfonyl group (preferably having 1 to 20 carbon atoms, more preferably 1 to 10 carbon atoms, and particularly preferably 1 to 6 carbon atoms, exemplified by a mesyl group and a tosyl group), a sulfinyl group (preferably having 1 to 20 carbon atoms, more preferably 1 to 10 carbon atoms, and particularly preferably 1 to 6 carbon atoms, exemplified by a methanesulfinyl group and a benzenesulfinyl group), a ureido group (preferably having 1 to 20 carbon atoms, more preferably 1 to 10 carbon atoms, and particularly preferably 1 to 6 carbon atoms, exemplified by an unsubstituted ureido group, a methylureido group, and a phenylureido group), a phosphoric acid amide group (preferably having 1 to 20 carbon atoms, more preferably 1 to 10 carbon atoms, and particularly preferably 1 to 6 carbon atoms, exemplified by a diethylphosphoric acid amide group and a phenylphosphoric acid amide group), a hydroxy group, a mercapto group, a halogen atom (for example, a fluorine atom, a chlorine atom, a bromine atom, and an iodine atom), a cyano group, a nitro group, a hydroxamic group, a sulfino group, a hydrazino group, an imino group, an azo group, a heterocyclic group (preferably having 1 to 30 carbon atoms, and more preferably 1 to 12 carbon atoms, which is a heterocyclic group having heteroatom(s) such as a nitrogen atom, an oxygen atom, and a sulfur atom, and is exemplified by an epoxy group, an oxetanyl group, an imidazolyl group, a pyridyl group, a quinolyl group, a furyl group, a piperidyl group, a morpholino group, a benzoxazolyl group, a benzimidazolyl group, and a benzthiazolyl group), and a silyl group (preferably having 3 to 40 carbon atoms, more preferably 3 to 30 carbon atoms, and particularly preferably 3 to 24 carbon atoms, exemplified by a trimethylsilyl group and a triphenylsilyl group).

Each of these substituents may be further substituted by any of these substituents. In a case where there are two or more substituents, these may be the same or different. If possible, the substituents may combine to form a ring.

In view of the fact that in Formula (1D), at least one of $C^1$ or $C^2$ represents a crosslinkable group and a light absorption anisotropic film has more excellent durability, both $C^1$ and $C^2$ are preferably crosslinkable groups.

Specific examples of the crosslinkable group include polymerizable groups described in paragraphs [0040] to [0050] of JP2010-244038A. From the viewpoint of reactivity and synthesis suitability, an acryloyl group, a methacryloyl group, an epoxy group, an oxetanyl group, and a styryl group are preferable, and an acryloyl group and a methacryloyl group are more preferable.

In Formula (1D), the divalent linking group represented by $M^1$ or $M^2$ will be described.

Examples of the divalent linking group include —O—, —S—. —CO—. —COO—, —OCO—, —O—CO—O—, —CO—NR$^N$—, —O—CO—NR$^N$—, —SO$_2$—, —SO—, an alkylene group, a cycloalkylene group, an alkenylene group, and a group obtained by combining two or more of the above groups.

Among these, a group obtained by combining an alkylene group and one or more groups selected from the group consisting of —O—, —S—, —CO—. —COO—. —OCO—, —O—CO—O—, —CO—NR$^N$—, —O—CO—NR$^N$—, —SO$_2$—, and —SO— is preferable. R$^N$ represents a hydrogen atom or an alkyl group.

In addition, in at least one of $M^1$ or $M^2$, the number of atoms of a main chain is 4 or more, preferably 7 or more, and more preferably 10 or more. The upper limit value of the number of atoms of a main chain is preferably 20 or less, and more preferably 15 or less.

Here, the "main chain" of $M^1$ refers to a portion necessary for directly connecting "$C^1$" and "Ar$^1$" in Formula (1D), and the "number of atoms of a main chain" refers to the number of atoms constituting the above portion. Similarly, the "main chain" of $M^2$ refers to a portion necessary for directly connecting "$C^2$" and "E" in Formula (1D), and the "number of atoms of a main chain" refers to the number of atoms constituting the above portion. The "number of atoms of a main chain" does not include the number of atoms of a branched chain to be described later.

Specifically, in Formula (D7), the number of atoms of a main chain of M1 is 6 (the number of atoms in the dotted frame on the left side of Formula (D7), and the number of atoms of a main chain of M2 is 7 (the number of atoms in the dotted frame on the right side of Formula (D7).

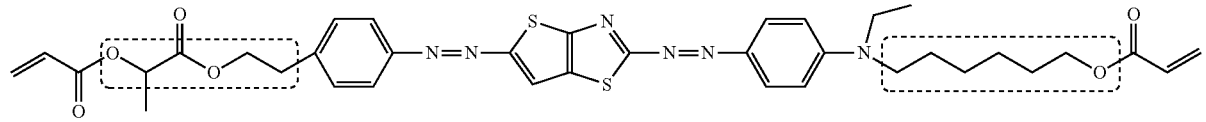

D7

At least one of $M^1$ or $M^2$ may be a group in which the number of atoms of a main chain is 4 or more, and in a case where the number of atoms of a main chain of one of $M^1$ and $M^2$ is 4 or more, the number of atoms of a main chain of the other may be 3 or less.

A total number of atoms of main chains of $M^1$ and $M^2$ is preferably 5 to 30, and more preferably 7 to 27. In a case where the total number of atoms of main chains is 5 or more, the specific dichroic dye compound is more easily polymerized, and in a case where the total number of atoms of main chains is 30 or less, a light absorption anisotropic film having an excellent alignment degree is obtained, or a light absorption anisotropic film having excellent heat resistance with an increasing melting point of the specific dichroic dye compound is obtained.

$M^1$ and $M^2$ may have a branched chain. Here, the "branched chain" in $M^1$ refers to a portion other than the portion necessary for directly connecting $C^1$ and $Ar^1$ in Formula (1D). Similarly, the "branched chain" in $M^2$ refers to a portion other than the portion necessary for directly connecting $C^2$ and E in Formula (1D).

The number of atoms of the branched chain is preferably 3 or less. In a case where the number of atoms of the branched chain is 3 or less, there is an advantage in that the alignment degree of a light absorption anisotropic film is further improved. The number of atoms of the branched chain does not include the number of hydrogen atoms.

Examples of preferable structures of $M^1$ and $M^2$ are as follows, but the invention is not limited thereto. In the following structures, "*" represents a connecting portion of $C^1$ and $Ar^1$ or a connecting portion of $C^2$ and E.

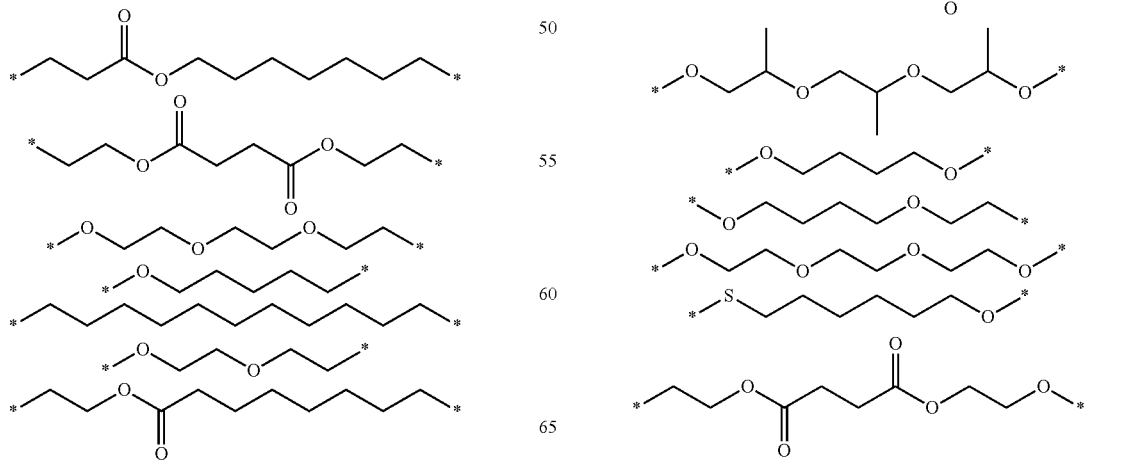

-continued

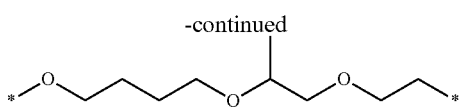

The "phenylene group which may have a substituent" the "naphthylene group which may have a substituent, and the "biphenylene group which may have a substituent" represented by $Ar^1$ or $Ar^2$ in Formula (1D) will be described.

The substituent is not particularly limited, and examples thereof include a halogen atom, an alkyl group, an alkyloxy group, an alkylthio group, an oxycarbonyl group, a thioalkyl group, an acyloxy group, an acylamino group, an alkoxycarbonylamino group, a sulfonylamino group, a sulfamoyl group, a carbamoyl group, sulfinyl group, and a ureido group. These substituents may be further substituted by any of these substituents. Among these, an alkyl group is preferable, and an alkyl group having 1 to 5 carbon atoms is more preferable. From the viewpoint of the ease of obtaining the raw material and the alignment degree, a methyl group and an ethyl group are preferable.

Each of $Ar^1$ and $Ar^2$ is a phenylene group which may have a substituent, a naphthylene group which may have a substituent, or a biphenylene group which may have a substituent, and from the viewpoint of the ease of obtaining the raw material which may have a substituent and the alignment degree, a phenylene group is preferable.

In Formula (1D), "$M^1$" and "N" connecting to $Ar^1$ are preferably positioned at a para position of $Ar^1$. In addition, "E" and "N" connecting to $Ar^2$ are preferably positioned at a para position of $Ar^1$.

The specific dichroic dye compound satisfies at least one of the following Condition 1 or Condition 2. Accordingly, a sufficiently long distance can be secured between a core portion (that is, thienothiazole azo structure) and a crosslinkable group of the specific dichroic dye compound, and thus the polymerization of the specific dichroic dye compound can be further promoted.

Condition 1: $C^1$ is a crosslinkable group, and the number of atoms of a main chain of $M^1$ is 4 or more.

Condition 2: $C^2$ is a crosslinkable group, and the number of atoms of a main chain of $M^2$ is 4 or more.

In Formula (1D), E represents any one of a nitrogen atom, an oxygen atom, and a sulfur atom. A nitrogen atom is preferable from the viewpoint of synthesis suitability.

E in Formula (1D) is preferably an oxygen atom from the viewpoint of the fact that it is easy to make the specific dichroic dye compound have absorption on the short wavelength side (for example, have a maximum absorption wavelength in the vicinity of 500 to 530 nm).

E in Formula (1D) is preferably a nitrogen atom from the viewpoint of the fact that it is easy to make the specific dichroic dye compound have absorption on the long wavelength side (for example, have a maximum absorption wavelength in the vicinity of 600 nm).

In Formula (1D), $R^1$ represents a hydrogen atom or a substituent.

Since specific examples and preferable aspects of the "substituent" represented by $R^1$ are the same as those of the substituent of $Ar^1$ or $Ar^2$ described above, the description thereof will be omitted.

In Formula (1D), $R^2$ represents a hydrogen atom or an alkyl group which may have a substituent, and an alkyl group which may have a substituent is preferable.

Examples of the substituent include a halogen atom, a hydroxyl group, an ester group, an ether group, and a thioether group.

Examples of the alkyl group include a linear, branched, or cyclic alkyl group having 1 to 8 carbon atoms. Among these, a linear alkyl group having 1 to 6 carbon atoms is preferable, a linear alkyl group having 1 to 3 carbon atoms is more preferable, and a methyl group or an ethyl group is even more preferable.

In a case where E is a nitrogen atom, $R^2$ is a group existing in Formula (1D) (that is, n=1). In a case where E is an oxygen atom or a sulfur atom, $R^2$ is a group which does not exist in Formula (1D) (that is, n=0).

In Formula (1D), n represents 0 or 1. In a case where E is a nitrogen atom, n is 1, and in a case where E is an oxygen atom or a sulfur atom, n is 0.

Hereinafter, specific examples of the specific dichroic dye compound will be shown, but the invention is not limited thereto.

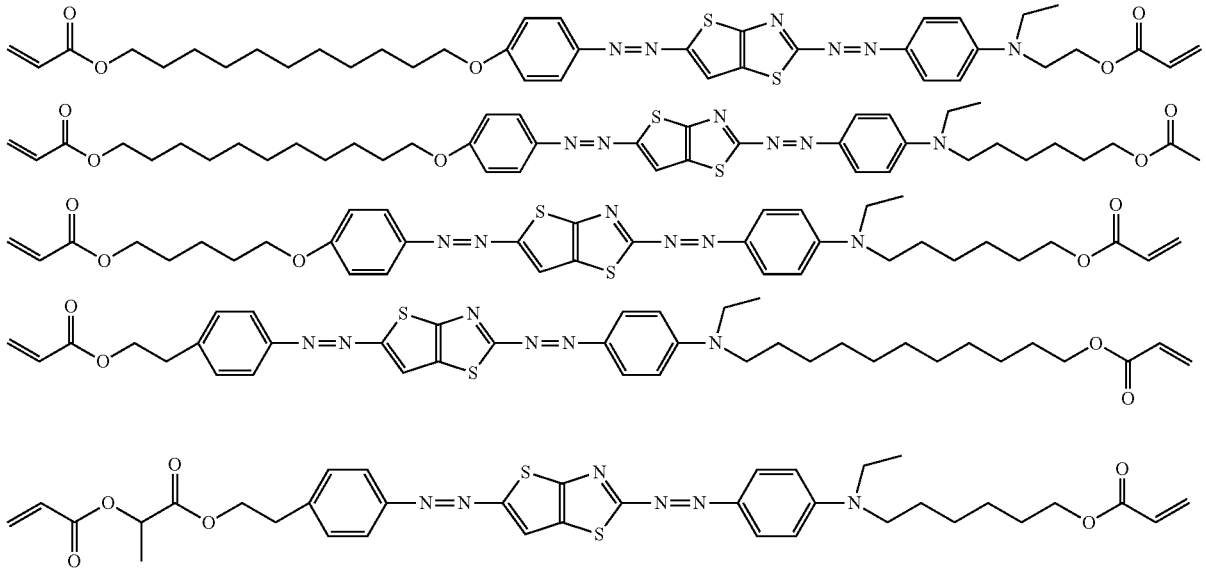

-continued

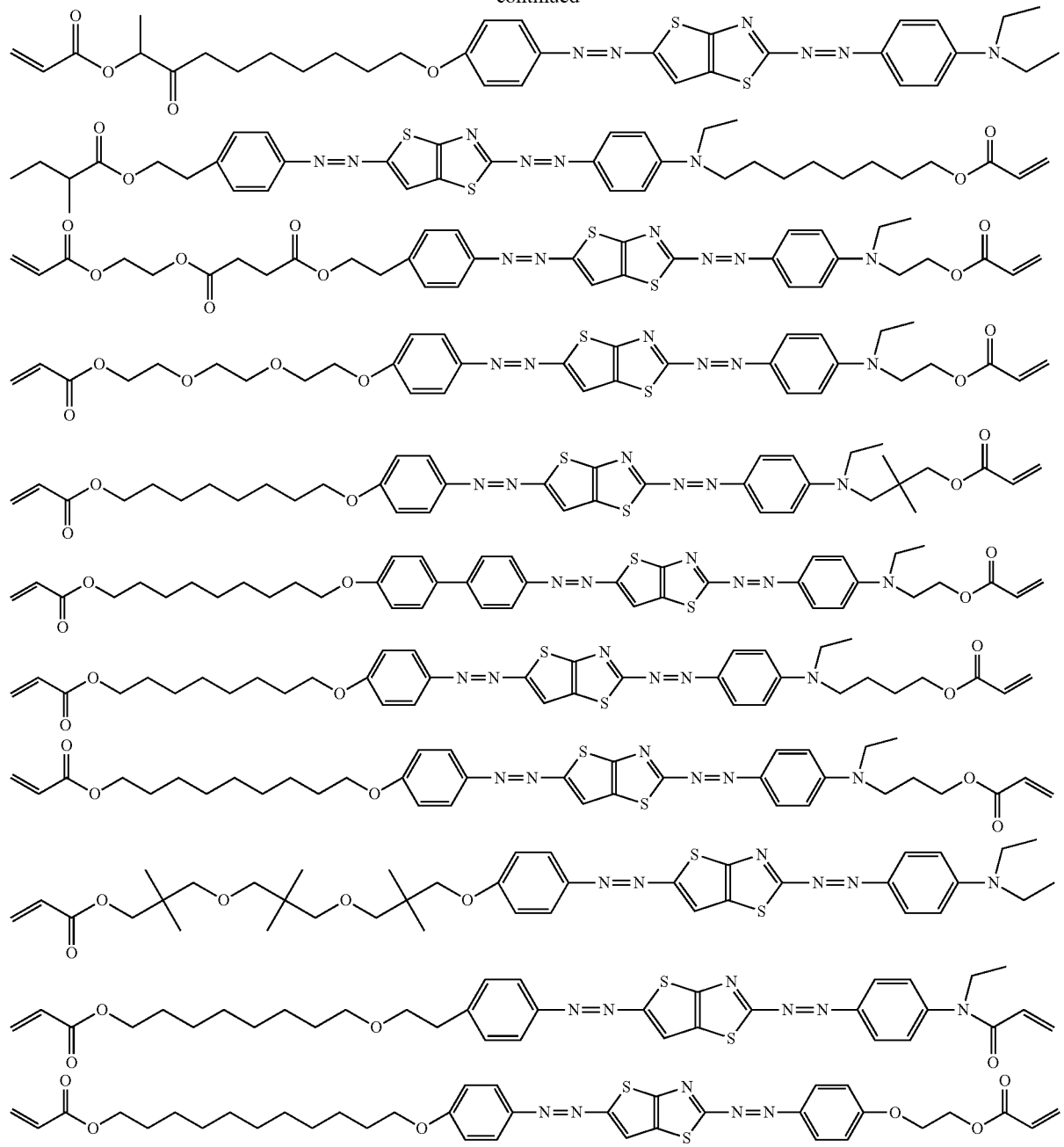

(Content)

The content of the specific dichroic dye compound is preferably 0.5 to 500 parts by mass, more preferably 5 to 300 parts by mass, and even more preferably 10 to 200 parts by mass with respect to 100 parts by mass of a liquid crystalline compound to be described later.

<Liquid Crystalline Compound>

The coloring composition according to the invention contains a liquid crystalline compound. In a case where the liquid crystalline compound is contained, it is possible to align the dichroic dye compound at a high alignment degree while suppressing the precipitation of the dichroic dye compound.

Any one of a low-molecular-weight liquid crystalline compound and a high-molecular-weight liquid crystalline compound can be used as the liquid crystalline compound. Here, the "low-molecular-weight liquid crystalline compound" refers to a liquid crystalline compound having no repeating unit in the chemical structure. The "high-molecular-weight liquid crystalline compound" refers to a liquid crystalline compound having a repeating unit in the chemical structure.

Examples of the low-molecular-weight liquid crystalline compound include liquid crystalline compounds described in JP2013-228706A.

Examples of the high-molecular-weight liquid crystalline compound include thermotropic liquid crystalline polymers described in JP2011-237513A and dichroic dye polymers having thermotropic liquid crystallinity described in JP2016-4055A. In addition, the high-molecular-weight liquid crystalline compound may have a crosslinkable group (for example, an acryloyl group and a methacryloyl group) at the terminal.

As the high-molecular-weight liquid crystalline compound, a high-molecular-weight liquid crystalline compound having a repeating unit represented by Formula (1), or a high-molecular-weight liquid crystalline compound having both a repeating unit represented by Formula (2) and a repeating unit represented by Formula (3) is preferably used. Hereinafter, the "high-molecular-weight liquid crystalline compound" may be abbreviated as a "polymer compound".

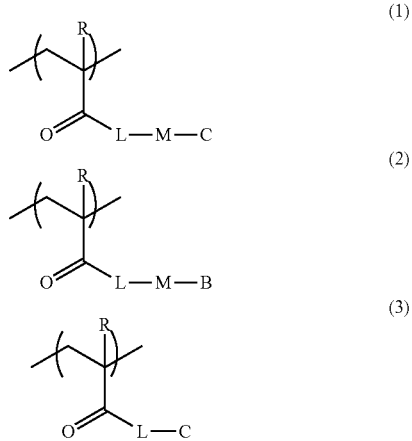

Here, in Formula (1), R represents a hydrogen atom or a methyl group, L represents a single bond or a divalent linking group, C represents a crosslinkable group, and M represents a mesogenic group represented by Formula (1-1).

In Formula (2), R, L, and M each represent the same atom, group, or bond as R, L, and M in Formula (1). B represents a hydrogen atom, a halogen atom, a cyano group, an alkyl group, an alkoxy group, an amino group, an oxycarbonyl group, an acyloxy group, an acylamino group, an alkoxycarbonylamino group, a sulfonylamino group, a sulfamoyl group, a carbamoyl group, an alkylthio group, a sulfonyl group, a sulfinyl group, or a ureido group.

In Formula (3), R, L, and C each represent the same atom, group, or bond as R, L, and C in Formula (1).

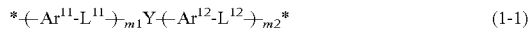

Here, in Formula (1-1), $Ar^{11}$ and $Ar^{12}$ each independently represent a phenylene group or a biphenylene group which may have a substituent, $L^{11}$ and $L^{12}$ each independently represent a single bond or a divalent linking group, Y represents an azo group, an imino group, a —OCO—CH=CH— group, or a —CH=CH—$CO_2$— group, and m1 and m2 each independently represent an integer of 1 to 3.

In a case where m1 is an integer of 2 to 3, plural $Ar^{11}$'s may be the same or different, and plural $L^{11}$'s may be the same or different.

In a case where m2 is an integer of 2 or 3, plural $Ar^{12}$'s may be the same or different, and plural $L^{12}$'s may be the same or different.

The divalent linking group represented by L in Formulae (1) to (3) will be described.

Examples of the divalent linking group include —O—, —S—, —COO—, —OCO—, —O—CO—O—, —$NR^N$CO—, —$CONR^N$—, an alkylene group, and a divalent group including a combination of two or more of the above groups. RN represents a hydrogen atom or an alkyl group.

Among these, a divalent group including a combination of an alkylene group and at least one group selected from the group consisting of —O—, —COO—, and —OCO— is preferable.

The number of carbon atoms of the alkylene group is preferably 2 to 16 from the viewpoint that the polymer compound has liquid crystallinity.

The crosslinkable group represented by C in Formula (1) or (3) will be described.

Examples of the crosslinkable group include polymerizable groups described in paragraphs [0040] to [0050] of JP2010-244038A. Among these, an acryloyl group, a methacryloyl group, an epoxy group, an oxetanyl group, or a styryl group is preferable, and an acryloyl group or a methacryloyl group (hereinafter, also abbreviated as "(meth) acryloyl group") is more preferable from the viewpoint of reactivity and synthesis suitability.

The mesogenic group, represented by M in Formula (1) or (2), represented by Formula (1-1) will be described. In Formula (1-1), * represents a bonding position with L or C in Formula (1), and in Formula (2), * represents a bonding position with L or B in Formula (2).

In Formula (1-1), $Ar^{11}$ and $Ar^{12}$ each independently represent a phenylene group or a biphenylene group which may have a substituent.

Here, the substituent is not particularly limited, and examples thereof include a halogen atom, an alkyl group, an alkyloxy group, an alkylthio group, an oxycarbonyl group, a thioalkyl group, an acyloxy group, an acylamino group, an alkoxycarbonylamino group, a sulfonylamino group, a sulfamoyl group, a carbamoyl group, sulfinyl group, and a ureido group.

In Formula (1-1), $L^{11}$ and $L^{12}$ each independently represent a single bond or a divalent linking group.

Here, examples of the divalent linking group include —O—, —S—, —COO—, —OCO—, —O—CO—O—, —$NR^N$CO—, —$CONR^N$—, an alkylene group, and a divalent group obtained by combining two or more of the above groups. $R^N$ represents a hydrogen atom or an alkyl group.

In Formula (1-1), Y represents an azo group, an imino group, a —OCO—CH=CH— group, or a —CH=CH—$CO_2$— group.

Among these, an azo group is preferable since the dichroic ratio of the light absorption anisotropic film is further improved.

In Formula (1-1), m1 and m2 each independently represent an integer of 1 to 3.

Here, a total of m1 and m2 is preferably an integer of 2 to 5, and more preferably an integer of 2 to 4 from the viewpoint that the polymer compound exhibits liquid crystallinity.

B in Formula (2) will be described.

B represents a hydrogen atom, a halogen atom, a cyano group, an alkyl group, an alkoxy group, an amino group, an oxycarbonyl group, an alkoxycarbonyl group, an acyloxy group, a (poly)alkyleneoxy group, an acylamino group, an alkoxycarbonylamino group, a sulfonylamino group, a sulfamoyl group, a carbamoyl group, an alkylthio group, a sulfonyl group, a sulfinyl group, or a ureido group.

Among these, a cyano group, an alkyl group, an alkoxy group, an oxycarbonyl group, an alkoxycarbonyl group, a (poly)alkyleneoxy group, or an alkylthio group is preferable, and an alkyl group, an alkoxy group, or a (poly)alkyleneoxy group is more preferable from the viewpoint of the exhibition of the liquid crystallinity of the polymer compound or the adjustment of a phase transition temperature and from the viewpoint of solubility.

Among B's, the number of carbon atoms of a hydrogen atom, a halogen atom, or an alkyl group or the like other than a cyano group is preferably 1 to 20, and more preferably 1 to 11 from the viewpoint of the exhibition of the liquid crystallinity of the polymer compound or the adjustment of a phase transition temperature and from the viewpoint of solubility.

The polymer compound may be either nematic or smectic, but it is preferable that the polymer compound exhibit at least a nematic property.

The temperature range in which the nematic phase is exhibited is preferably a room temperature (23° C.) to 300° C., and from the viewpoint of handling or manufacturing suitability, preferably 50° C. to 200° C.

In the invention, in a case where a polymer compound having both the repeating unit represented by Formula (2) and the repeating unit represented by Formula (3) is used, the ratio between the repeating unit represented by Formula (2) and the repeating unit represented by Formula (3) is preferably within a range of 99.9:0.1 to 20:80, more preferably within a range of 99.5:0.5 to 35:65, and even more preferably within a range of 99:1 to 50:50 in terms of molar ratio.

Furthermore, in the invention, the weight average molecular weight (Mw) of the polymer compound is preferably 1,000 to 100,000, and more preferably 2,000 to 60,000. The number average molecular weight (Mn) is preferably 500 to 80,000, and more preferably 1,000 to 30,000.

Here, the weight average molecular weight and the number average molecular weight are values measured through gel permeation chromatography (GPC).

Solvent (eluent): Tetrahydrofuran
Device Name: TOSOH HLC-8220GPC
Column: Three columns of TOSOH TSKgel Super HZM-H (4.6 mm×15 cm) are connected and used.
Column Temperature: 25° C.
Sample concentration: 0.1 mass %
Flow Rate: 0.35 ml/min
Calibration Curve: A calibration curve obtained by 7 samples of TSK standard polystyrene manufactured by TOSOH Corporation, Mw=2,800,000 to 1,050 (Mw/Mn=1.03 to 1.06) is used.

In the invention, the maximum absorption wavelength of the polymer compound is preferably 380 nm or less since the alignment of the dichroic dye compound is more easily maintained in a visible light region due to small absorption in the visible light region.

In addition, in the invention, the number of benzene rings included in the mesogenic group of the polymer compound is preferably 3 or more, and more preferably 4 or more since the dichroic ratio of the light absorption anisotropic film is further improved.

Specific examples of the polymer compound having a repeating unit represented by Formula (1) among the polymer compounds contained in the coloring composition according to the invention include polymer compounds represented by the following structural formulae. In the following structural formulae, R represents a hydrogen atom or a methyl group.

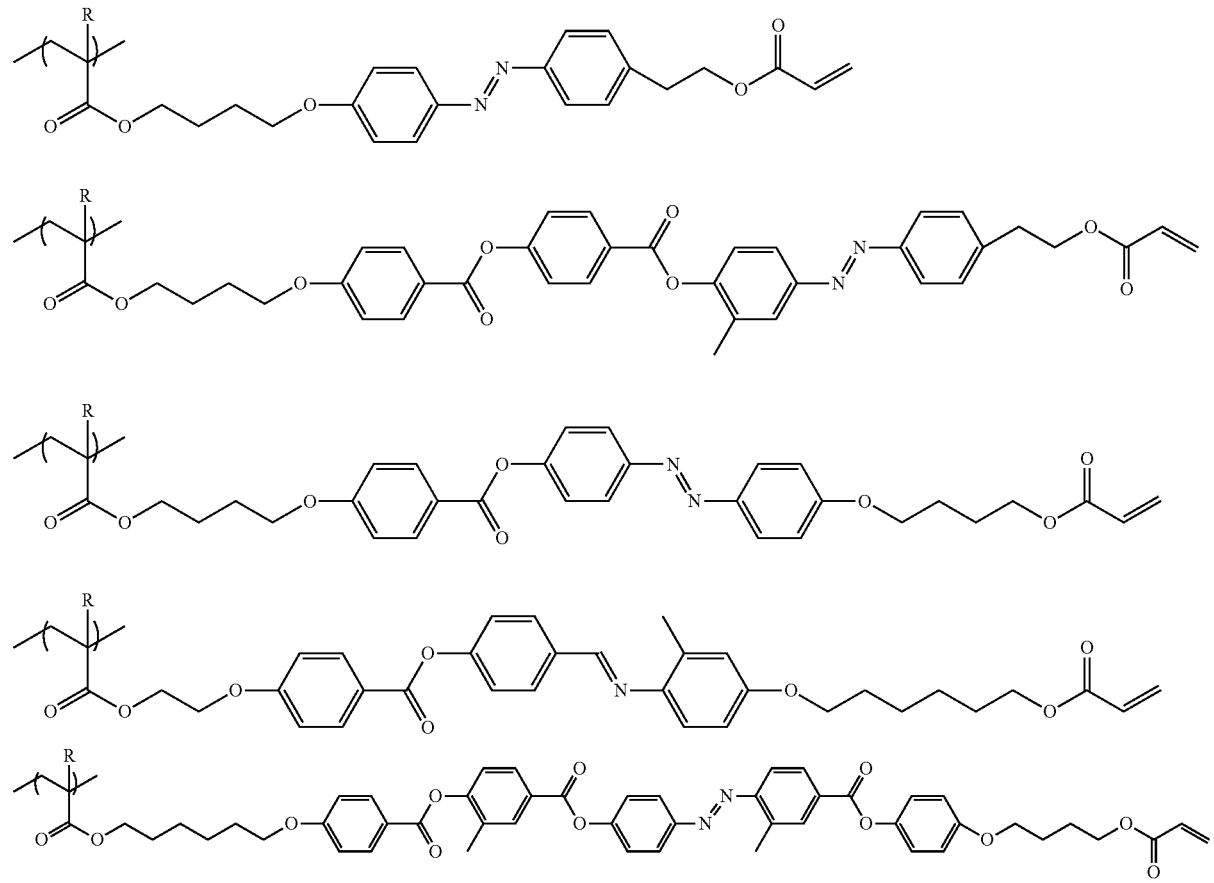

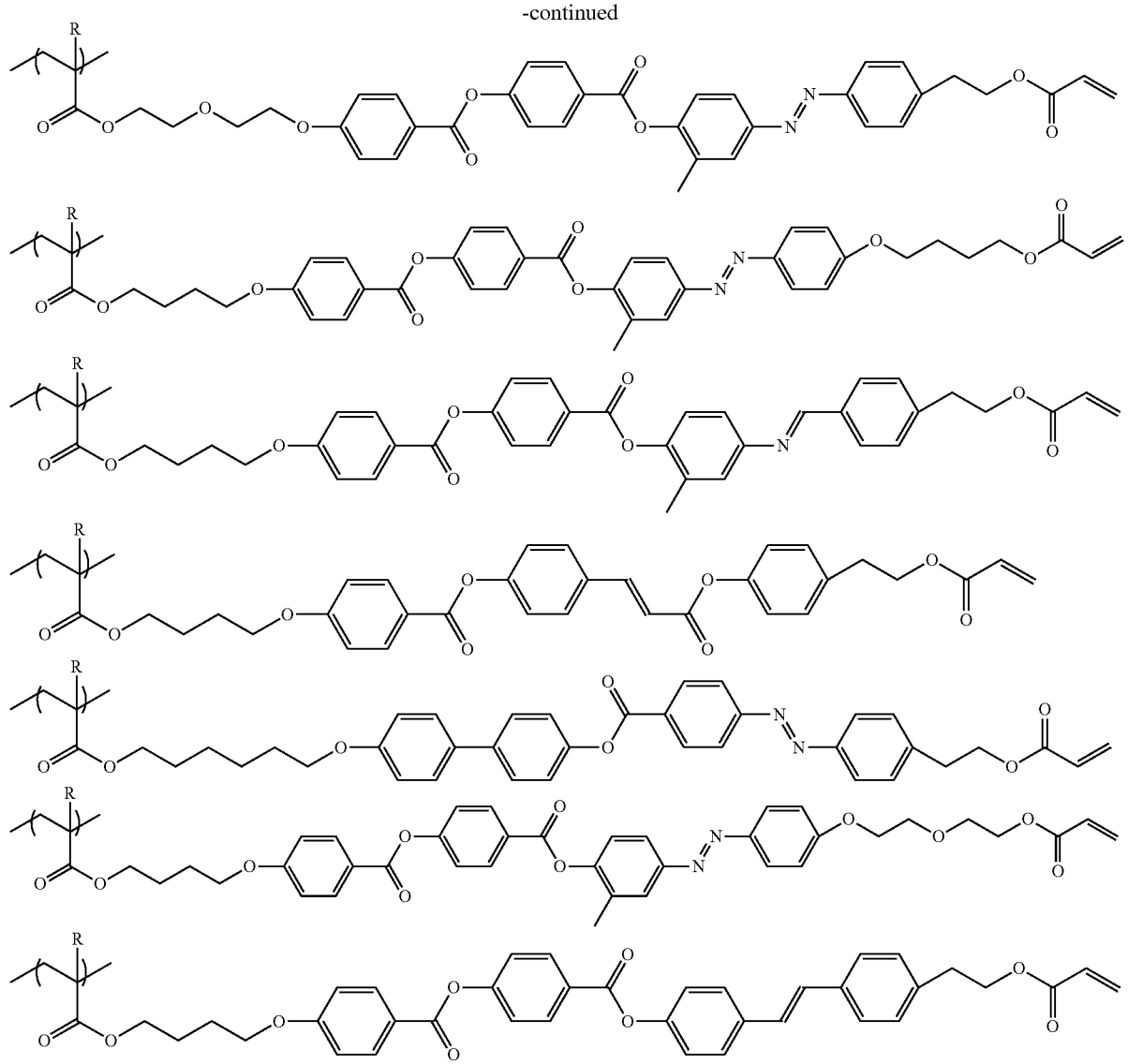

Specific examples of the repeating unit represented by Formula (2) in the polymer compound having both the repeating unit represented by Formula (2) and the repeating unit represented by Formula (3) among the polymer compounds contained in the coloring composition according to the invention include repeating units represented by the following structural formulae. In the following structural formulae, R represents a hydrogen atom or a methyl group.

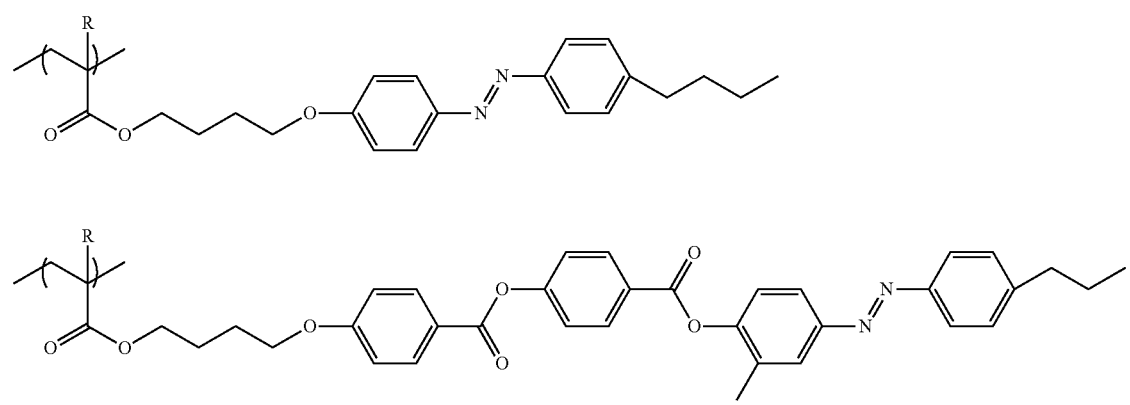

-continued

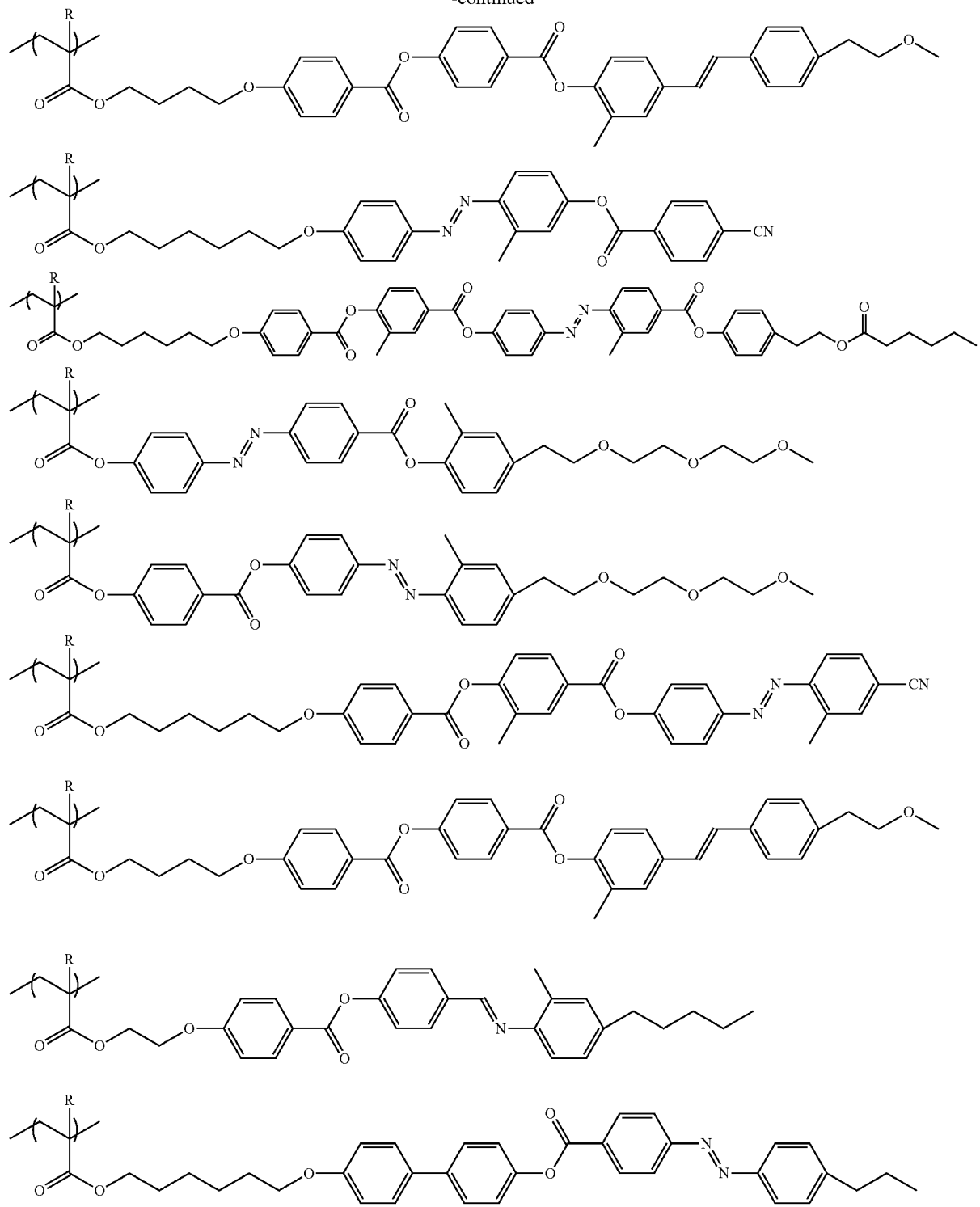

Specific examples of the repeating unit represented by Formula (3) in the polymer compound having both the repeating unit represented by Formula (2) and the repeating unit represented by Formula (3) include repeating units represented by the following structural formulae. In the following structural formulae, R represents a hydrogen atom or a methyl group.

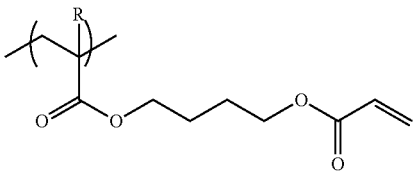

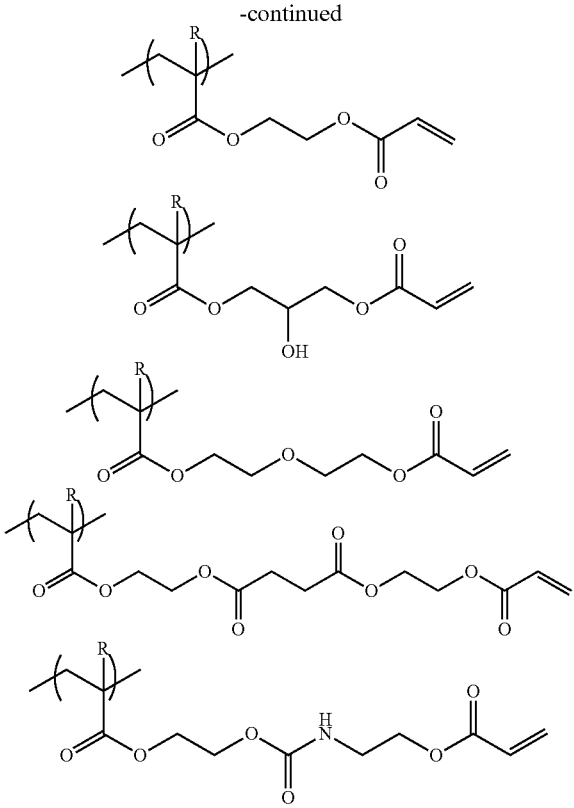

<Solvent>

The coloring composition according to the invention preferably contains a solvent from the viewpoint of workability or the like.

Examples of the solvent include organic solvents such as ketones (for example, acetone, 2-butanone, methyl isobutyl ketone, cyclopentanone, and cyclohexanone), ethers (for example, dioxane, tetrahydrofuran, and cyclopentyl methyl ether), aliphatic hydrocarbons (for example, hexane), alicyclic hydrocarbons (for example, cyclohexane), aromatic hydrocarbons (for example, benzene, toluene, xylene, and trimethylbenzene), halogenated carbons (for example, dichloromethane, trichloromethane (chloroform), dichloroethane, dichlorobenzene, and chlorotoluene), esters (for example, methyl acetate, ethyl acetate, and butyl acetate), alcohols (for example, ethanol, isopropanol, butanol, and cyclohexanol), cellosolves (for example, methyl cellosolve, ethyl cellosolve, and 1,2-dimethoxyethane), cellosolve acetates, sulfoxides (for example, dimethyl sulfoxide), amides (for example, dimethylformamide and dimethylacetamide), and heterocyclic compounds (for example, pyridine), and water. These solvents may be used alone or in combination of two or more kinds thereof.

Among these solvents, organic solvents are preferably used, and halogenated carbons or ketones are more preferably used.

In a case where the coloring composition according to the invention contains a solvent, the content of the solvent is preferably 70 to 99.5 mass %, more preferably 85 to 99.0 mass %, and even more preferably 80 to 97 mass % with respect to the total mass of the coloring composition.

<Interface Improver>

The coloring composition according to the invention preferably contains an interface improver. Due to the interface improver contained, the smoothness of the coating surface is improved and the alignment degree is improved. Otherwise, cissing and unevenness are suppressed, and thus an improvement in the in-plane uniformity is anticipated.

As the interface improver, a material making the liquid crystalline compound horizontal on the coating surface side is preferable, and compounds (horizontal alignment agents) described in paragraphs [0253] to [0293] of JP2011-237513A can be used.

In a case where the coloring composition according to the invention contains an interface improver, the content of the interface improver is preferably 0.001 to 5 parts by mass, and more preferably 0.01 to 3 parts by mass with respect to a total of 100 parts by mass of the dichroic dye compound and the liquid crystalline compound in the coloring composition.

<Polymerization Initiator>

The coloring composition used in the invention preferably contains a polymerization initiator.

The polymerization initiator is not particularly limited, and a photosensitive compound, that is, a photopolymerization initiator is preferable.

As the photopolymerization initiator, various kinds of compounds can be used with no particular limitation. Examples of the photopolymerization initiator include α-carbonyl compounds (the specifications of U.S. Pat. Nos. 2,367,661A and 2,367,670A), acyloin ethers (the specification of U.S. Pat. No. 2,448,828A), aromatic acyloin compounds substituted by α-hydrocarbon (the specification of U.S. Pat. No. 2,722,512A), polynuclear quinone compounds (the specifications of U.S. Pat. Nos. 3,046,127A and 2,951,758A), combinations of triarylimidazole dimers and p-aminophenyl ketones (the specification of U.S. Pat. No. 3,549,367A), acridine and phenazine compounds (the specifications of JP1985-105667A (JP-S60-105667A) and U.S. Pat. No. 4,239,850A), oxadiazole compounds (the specification of U.S. Pat. No. 4,212,970A), and acylphosphine oxide compounds (JP1988-40799B (JP-S63-40799B), JP1993-29234B (JP-H5-29234B), JP1998-95788B (JP-H10-95788B), and JP1998-29997B (JP-H10-29997B)).

A commercially available product can also be used as the photopolymerization initiator, and examples thereof include IRGACURE 184, IRGACURE 907, IRGACURE 369, IRGACURE 651, IRGACURE 819, IRGACURE OXE-01, and IRGACURE OXE-02 manufactured by BASF SE.

In a case where the coloring composition according to the invention contains a polymerization initiator, the content of the polymerization initiator is preferably 0.01 to 30 parts by mass, and more preferably 0.1 to 15 parts by mass with respect to a total of 100 parts by mass of the dichroic dye compound and the liquid crystalline compound in the coloring composition. In a case where the content of the polymerization initiator is 0.01 parts by mass or greater, the durability of the light absorption anisotropic film is improved, and in a case where the content of the polymerization initiator is 30 parts by mass or less, the alignment of the light absorption anisotropic film is improved.

<Other Components>

The coloring composition according to the invention may further contain a dichroic dye compound other than the specific dichroic dye compound, or contain a plurality of the specific dichroic dye compounds. In a case where a plurality of dichroic dye compounds are contained, it is preferable that a dichroic dye compound having a crosslinkable group crosslinking with the specific dichroic dye compound be contained, and it is more preferable that a plurality of the specific dichroic dye compounds be contained from the viewpoint of further curing of the coloring composition according to the invention.

The dichroic dye compound other than the specific dichroic dye compound is not particularly limited, and examples thereof include dichroic dye compounds described in paragraphs [0008] to [0026] of JP2013-227532A and paragraphs [0012] to [0029] of JP2013-109090A.

In addition, in a case where a polarizing element (polarizing plate) having good polarizing performance in the whole visible region is produced, the dichroic dye compound other than the specific dichroic dye compound is preferably a dye having a maximum absorption wavelength within a wavelength range of 380 to 550 nm. Examples of such a dichroic dye compound include dichroic dye compounds described in paragraphs [0005] to [0031] of JP2016-006502A, paragraphs [0067] to [0071] of JP2013-228706A, paragraphs [0012] to [0018] of JP2013-210624A, paragraphs [0008] to [0015] of JP2013-209367A, paragraphs [0016] to [0018] of JP1999-305036A (JP-H11-305036A), and paragraphs [0030] to [0169] of JP2011-215337A.

[Light Absorption Anisotropic Film]

The light absorption anisotropic film according to the invention is formed using the above-described coloring composition.

Examples of the method of manufacturing the light absorption anisotropic film according to the invention include a method including, in order, a step of forming a coating film by applying the coloring composition to a base (hereinafter, also referred to as "coating film forming step") and a step of aligning a liquid crystalline component contained in the coating film (hereinafter, also referred to as "alignment step"). The liquid crystalline component refers to both the specific dichroic dye compound and the liquid crystalline compound.

Hereinafter, the method of manufacturing the light absorption anisotropic film will be described for each step.

<Coating Film Forming Step>

The coating film forming step is a step of forming a coating film by applying the coloring composition to a base.

By using a coloring composition containing the above-described solvent, or a liquid material such as a molten liquid obtained by heating the coloring composition, the coloring composition is easily applied to the base.

Examples of the method of applying the coloring composition include known methods such as a roll coating method, a gravure printing method, a spin coating method, a wire bar coating method, an extrusion coating method, a direct gravure coating method, a reverse gravure coating method, a die coating method, a spray method, and an ink jet method.

In this aspect, an example has been given in which the coloring composition is applied to the base, but the invention is not limited thereto. For example, the coloring composition may be applied to an alignment film provided on the base. Details of the alignment film will be described later.

<Alignment Step>

The alignment step is a step of aligning a liquid crystalline component contained in the coating film. Thus, a light absorption anisotropic film is obtained.

The alignment step may have a drying treatment. Through the drying treatment, a component such as a solvent can be removed from the coating film. The drying treatment may be performed by a method of leaving the coating film for a predetermined time at room temperature (for example, natural drying), or a heating and/or air blowing method.

Here, the liquid crystalline component contained in the coloring composition may be aligned by the above-described coating film forming step or drying treatment. For example, in an aspect in which the coloring composition is prepared as a coating liquid containing a solvent, the coating film is dried to remove the solvent from the coating film, and thus a coating film having light absorption anisotropy (that is, light absorption anisotropic film) is obtained.

A heating treatment to be described later may not be performed in a case where the drying treatment is performed at a temperature of not lower than a temperature at which the liquid crystalline component contained in the coating film transits to a liquid crystalline phase.

The temperature at which the liquid crystalline component contained in the coating film transits to a liquid crystalline phase is preferably 10° C. to 250° C., and more preferably 25° C. to 190° C. in view of manufacturing suitability or the like. The transition temperature is preferably 10° C. or higher since a cooling treatment or the like for lowering the temperature to a temperature range in which the liquid crystalline phase is exhibited is not required. In addition, the transition temperature is preferably 250° C. or lower since even in an isotropic liquid state with a temperature higher than the temperature range in which the liquid crystalline phase is exhibited, high temperature is not required, and thus the waste of thermal energy and the deformation, degeneration, or the like of the substrate can be reduced.

The alignment step preferably has a heating treatment. Accordingly, the liquid crystalline component contained in the coating film can be aligned, and thus the coating film after the heating treatment can be preferably used as a light absorption anisotropic film.

The heating treatment is preferably performed at 10° C. to 250° C., and more preferably at 25° C. to 190° C. in view of manufacturing suitability or the like. The heating time is preferably 1 to 300 seconds, and more preferably 1 to 60 seconds.

The alignment step may have a cooling treatment to be performed after the heating treatment. The cooling treatment is a treatment for cooling the coating film after the heating to about room temperature (20° C. to 25° C.). Accordingly, the alignment of the liquid crystalline component contained in the coating film can be fixed. The cooling means is not particularly limited, and the cooling can be performed by a known method.

By the above steps, a light absorption anisotropic film can be obtained.

In this aspect, examples of the method of aligning the liquid crystalline component contained in the coating film include the drying treatment and the heating treatment, but are not limited thereto, and a known alignment treatment can be used.

<Other Steps>

The method of manufacturing a light absorption anisotropic film may have a step of curing the light absorption anisotropic film (hereinafter, also referred to as "curing step") after the alignment step. Accordingly, a light absorption anisotropic film having more excellent durability is obtained.

The curing step is performed by, for example, heating and/or light irradiation (exposure). Among these, light irradiation is preferably performed to conduct the curing step.

As the light source used for curing, various light sources can be used such as infrared rays, visible light, and ultraviolet rays, and ultraviolet rays are preferable. In the curing, ultraviolet rays may be applied during heating, or may be applied via a filter which transmits only a component with a specific wavelength.

In a case where the exposure is performed during heating, although depending on the temperature at which the liquid crystalline component contained in the light absorption anisotropic film transits to a liquid crystalline phase, the heating temperature during the exposure is preferably 25° C. to 140° C.

In addition, the exposure may be performed under a nitrogen atmosphere. In a case where the light absorption anisotropic film is cured by radical polymerization, inhibition of the polymerization by oxygen is reduced, and thus the exposure is preferably performed under a nitrogen atmosphere.

The film thickness of the light absorption anisotropic film is preferably 0.1 to 5.0 µm, and more preferably 0.3 to 1.5 µm. Although depending on the concentration of the dichroic dye compound in the coloring composition, a light absorption anisotropic film having an excellent absorbance is obtained in a case where the film thickness is 0.1 µm or greater, and a light absorption anisotropic film having an excellent transmittance is obtained in a case where the film thickness is 5.0 µm or less.

[Laminate]

A laminate according to the invention has a base and the light absorption anisotropic film formed on the base. The laminate according to the invention may further have a λ/4 plate formed on the light absorption anisotropic film or an oxygen shielding layer formed on the light absorption anisotropic film. In addition, the laminate according to the invention may have both the λ/4 plate and the oxygen shielding layer.

In addition, the laminate according to the invention preferably has an alignment film between the base and the light absorption anisotropic film.

Hereinafter, the constituent layers of the laminate will be described.

<Base>

The base can be selected in accordance with usage of the light absorption anisotropic film, and examples thereof include glass and a polymer film. The light transmittance of the base is preferably 80% or greater.

The base may also serve as a substrate of an image display device, or as a laminate including a functional layer as a liquid crystal display device. For example, in a liquid crystal display device to be described later, the base may also serve as a glass substrate of a liquid crystal cell, or as a laminate including a color filter or a transparent electrode.

In a case where a polymer film is used as the base, an optically isotropic polymer film is preferably used. As specific examples and preferable aspects of the polymer, those described in a paragraph [0013] of JP2002-22942A can be applied. In addition, even a conventionally known polymer such as polycarbonate or polysulfone in which birefringence is likely to be developed can also be used by reducing the developability through molecular modification described in WO00/26705A.

<Light Absorption Anisotropic Film>

Since the light absorption anisotropic film is as described above, the description thereof will be omitted.

<λ/4 Plate>

The "λ/4 plate" is a plate having a λ/4 function, and is specifically, a plate having a function of converting linearly polarized light with a specific wavelength into circularly polarized light (or converting circularly polarized light into linearly polarized light).

Specific examples of the λ/4 plate include those described in US2015/0277006A.

For example, in an aspect in which the λ/4 plate has a single layer structure, specific examples of the plate include a retardation film in which an optically anisotropic layer having a λ/4 function is provided on a stretched polymer film or a support. In an aspect in which the λ/4 plate has a multilayered structure, specific examples of the plate include a broadband λ/4 plate having a laminate of a λ/4 plate and a λ/2 plate.

The λ/4 plate and the light absorption anisotropic film may be provided in contact with each other, or another layer may be provided between the λ/4 plate and the light absorption anisotropic film. Examples of the layer include a pressure sensitive layer and an adhesive layer.

<Oxygen Shielding Layer>

The laminate according to the invention may have an oxygen shielding layer to improve the heat resistance.

The "oxygen shielding layer" is an oxygen shielding film having an oxygen shielding function, and specific examples thereof include a layer containing an organic compound such as polyvinyl alcohol, polyethylene vinyl alcohol, polyvinyl ether, polyvinylpyrrolidone, polyacrylamide, polyacrylic acid, cellulose ether, polyamide, polyimide, styrene/maleic acid copolymer, gelatin, vinylidene chloride, or cellulose nanofiber.

In this specification, the oxygen shielding function is not limited to a state in which the oxygen is completely blocked, and also includes a state in which the oxygen is slightly fed in accordance with target performance.

A thin layer formed of a metallic compound (metallic compound thin layer) is also exemplified. As a method of forming a metallic compound thin layer, any method can be used as long as it is a method for forming a target thin layer. For example, a sputtering method, a vacuum deposition method, an ion plating method, a plasma chemical vapor deposition (CVD) method, or the like is applied, and specifically, a forming method described in JP3400324B, JP2002-322561A, or JP2002-361774A can be employed.

A component contained in the metallic compound thin layer is not particularly limited as long as the oxygen shielding function can be exhibited. For example, an oxide, nitride, or oxynitride including one or more kinds of metal selected from Si, Al, In, Sn, Zn, Ti, Cu, Ce, and Ta can be used. Among these, an oxide, nitride, or oxynitride of a metal selected from Si, Al, In, Sn, Zn, and Ti is preferable, and an oxide, nitride, or oxynitride of a metal selected from Si, Al, Sn, and Ti is particularly preferable. These may contain other elements as secondary components.

As described in, for example, U.S. Pat. No. 6,413,645A, JP2015-226995A, JP2013-202971A, JP2003-335880A, JP1978-12953B (JP-S53-12953B), or JP1983-217344B (JP-S58-217344B), the oxygen shielding layer may have a lamination form of a layer containing an organic material and a metallic compound thin layer as described above, or as described in WO2011/11836A, JP2013-248832A, or JP3855004B, the oxygen shielding layer may be a layer obtained by hybridization of an organic compound and an inorganic compound.

In a case where the laminate according to the invention has the kg plate and the λ/4 plate is a retardation film in which an optically anisotropic layer having a λ/4 function is provided on a support, the oxygen shielding layer also serve as an alignment film of the optically anisotropic layer having a λ/4 function. In that case, an oxygen shielding layer containing polyvinyl alcohol, polyamide, or polyimide is preferable.

The film thickness of the oxygen shielding layer is preferably 0.1 to 10 μm, and more preferably 0.5 to 5.5 μm in a case where the oxygen shielding layer contains an organic compound. In a case where the oxygen shielding layer is a metallic compound thin layer, the film thickness of the oxygen shielding layer is preferably 5 nm to 500 nm, and more preferably 10 nm to 200 nm.

Since the oxygen shielding layer is effective in a situation where high heat is applied to the laminate, the oxygen shielding layer may be removed after the situation where high heat is applied, and then a different layer may be formed.

<Alignment Film>

The laminate according to the invention may have an alignment film between the base and the light absorption anisotropic film.

As the alignment film, any layer may be used as long as it allows the liquid crystalline component contained in the coloring composition according to the invention to have a desired alignment state.

The alignment film can be provided by means of a rubbing treatment on the film surface with an organic compound (preferably a polymer), oblique vapor deposition of an inorganic compound, forming a layer having microgrooves, or accumulation of an organic compound (for example, ω-tricosanoic acid, dioctadecylmethylammonium chloride or methyl stearate) by the Langmure-Blogette method (LB film). Furthermore, there have been known alignment films having an aligning function imparted thereto by applying an electrical field, applying a magnetic field, or light irradiation. In the invention, among these, an alignment film formed by a rubbing treatment is preferable in view of easy control of a pretilt angle of the alignment film, and a photo-alignment film formed by light irradiation is also preferable in view of alignment uniformity.

(Rubbed Alignment Film)

The polymer material used for an alignment film formed by a rubbing treatment is described in many literatures, and many commercially available products are available. In the invention, polyvinyl alcohol or polyimide, or derivatives thereof can be preferably used. Regarding the alignment film, the description in the 24th line on page 43 to 8th line on page 49 in WO01/88574A1 can be referred to. The thickness of the alignment film is preferably 0.01 to 10 μm, and more preferably 0.01 to 1 μm.

(Photo-Alignment Film)

The photo-alignment material used for an alignment film formed by light irradiation is described in many literatures. In the invention, preferable examples thereof include azo compounds described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B, aromatic ester compounds described in JP2002-229039A, maleimide and/or alkenyl-substituted nadimide compounds having photo-alignment units described in JP2002-265541A and JP2002-317013A, photocrosslinkable silane derivatives described in JP4205195B and JP4205198B, and photocrosslinkable polyimides, polyamides, and esters described in JP2003-520878A, JP2004-529220A, and JP4162850B. Azo compounds, photocrosslinkable polyimides, polyamides, and esters are more preferable.

To a photo-alignment film formed from the above-described material, linearly polarized light or unpolarized light is applied to manufacture a photo-alignment film.

In this specification, the "linearly polarized light irradiation" and the "unpolarized light irradiation" are operations for causing a photoreaction to the photo-alignment material. The wavelength of the light used is not particularly limited as long as the wavelength varies depending on the photo-alignment material used and is a wavelength necessary for the photoreaction. The peak wavelength of the light used for light irradiation is preferably 200 to 700 nm, and ultraviolet light having a light peak wavelength of 400 nm or less is more preferable.

The light source used for light irradiation is a usually used light source, and examples thereof include lamps such as a tungsten lamp, a halogen lamp, a xenon lamp, a xenon flash lamp, a mercury lamp, a mercury/xenon lamp, and a carbon arc lamp, various lasers [for example, a semiconductor laser, a helium/neon laser, an argon ion laser, a helium/cadmium laser, and an YAG (yttrium/aluminum/garnet) laser], light emitting diodes, and cathode ray tubes.

As means for obtaining linearly polarized light, a method using a polarizing plate (for example, an iodine polarizing plate, a dichroic dye polarizing plate, or a wire grid polarizing plate), a method using a prism-based element (for example, a GLAN-THOMSON prism) or a reflective polarizer using a BREWSTER angle, or a method using light emitted from a polarized laser light source can be employed. Only light having a necessary wavelength may be selectively applied by using a filter, a wavelength conversion element, or the like.

In a case where linearly polarized light is used as light for irradiation, a method of irradiating the alignment film with light from an upper surface or a rear surface in a direction perpendicular or oblique to the alignment film surface is employed. Although the incidence angle of the light varies depending on the photo-alignment material, the incidence angle is preferably 0° to 90°, and more preferably 40° to 90°.

In a case where unpolarized light is used, the alignment film is irradiated with unpolarized light from an oblique direction. The incidence angle of the light is preferably 10° to 80°, more preferably 20° to 60°, and even more preferably 30° to 50°.

The irradiation time is preferably 1 minute to 60 minutes, and more preferably 1 minute to 10 minutes.

In a case where patterning is required, a method of performing light irradiation using a photomask as many times as necessary for pattern formation, or a pattern writing method using laser beam scanning can be employed.

<Usage>

The laminate according to the invention can be used as a polarizing element (polarizing plate). For example, it can be used as a linearly polarizing plate or a circularly polarizing plate.

In a case where the laminate according to the invention has no optically anisotropic layer such as the λ/4 plate, the laminate can be used as a linearly polarizing plate. In a case where the laminate according to the invention has the λ/4 plate, the laminate can be used as a circularly polarizing plate.

[Image Display Device]

An image display device according to the invention has the above-described light absorption anisotropic film or the above-described laminate.

The display element used for the image display device according to the invention is not particularly limited, and examples thereof include a liquid crystal cell, an organic electroluminescence (hereinafter, abbreviated as "EL"), a display panel, and a plasma display panel.

Among these, a liquid crystal cell or an organic EL display panel is preferable, and a liquid crystal cell is more preferable. That is, as the image display device according to the invention, a liquid crystal display device using a liquid crystal cell as a display element, or an organic EL display device using an organic EL display panel as a display element is preferable, and a liquid crystal display device is more preferable.

<Liquid Crystal Display Device>

A liquid crystal display device as an example of the image display device according to the invention preferably has an aspect in which it has the above-described light absorption anisotropic film and a liquid crystal cell. More preferably, the liquid crystal display device has the above-described laminate (but including no λ/4 plate) and a liquid crystal cell.

In the invention, it is preferable that the light absorption anisotropic film (laminate) according to the invention be used as a polarizing element on the front side among light absorption anisotropic films (laminates) to be provided on both sides of a liquid crystal cell, and it is more preferable that the light absorption anisotropic film (laminate) according to the invention be used as polarizing elements on the front side and the rear side.

Hereinafter, the liquid crystal cell of the liquid crystal display device will be described in detail.

(Liquid Crystal Cell)

The liquid crystal cell used for the liquid crystal display device is preferably a vertical alignment (VA) mode, an optical compensated bend (OCB) mode, an in-plane-switching (IPS) mode, or a twisted nematic (TN) mode, but is not limited thereto.

In a TN mode liquid crystal cell, with no application of a voltage, rod-like liquid crystalline molecules are substantially horizontally aligned, and twist-aligned by 60° to 120°. The TN mode liquid crystal cell is most frequently used as a color thin film transistor (TFT) liquid crystal display device, and is described in many literatures.

In a VA mode liquid crystal cell, rod-like liquid crystalline molecules are substantially vertically aligned with no application of a voltage. The VA mode liquid crystal cell includes (1) a narrowly-defined VA mode liquid crystal cell in which rod-like liquid crystalline molecules are substantially vertically aligned with no application of a voltage, and are substantially horizontally aligned with the application of a voltage (described in JP1990-176625A (JP-H2-176625A)), (2) a (MVA mode) liquid crystal cell in which the VA mode is made into multi-domains in order to expand the viewing angle (described in SID97, Digest of tech. Papers (proceedings) 28 (1997) 845), (3) an (n-ASM mode) liquid crystal cell in which rod-like liquid crystalline molecules are substantially vertically aligned with no application of a voltage, and are twisted in multi-domains with the application of a voltage (described in the proceedings 58 and 59 of Japanese Liquid Crystal Conference (1998)), and (4) a SURVIVAL mode liquid crystal cell (announced at LCD internal 98). In addition, the VA mode liquid crystal cell may be any one of a patterned vertical alignment (PVA) type, an optical alignment type, and a polymer-sustained alignment (PSA) type. Details of these modes are described in JP2006-215326A and JP2008-538819A.

In an IPS mode liquid crystal cell, rod-like liquid crystalline molecules are substantially horizontally aligned with respect to a substrate, and the liquid crystalline molecules respond in a planar manner with the application of an electric field parallel to a substrate surface. The IPS mode displays a black image in a state in which no electric field is applied thereto, and the absorption axes of a pair of upper and lower polarizing plates are perpendicular to each other. A method of improving the viewing angle by reducing light leakage caused when a black image is displayed in an oblique direction using an optical compensation sheet is disclosed by JP1998-54982A (JP-H10-54982A), JP1999-202323A (JP-H11-202323A), JP1997-292522A (JP-H9-292522A), JP1999-133408A (JP-H11-133408A), JP1999-305217A (JP-H11-305217A), JP1998-307291A (JP-H10-307291A), and the like.

<Organic EL Display Device>

An organic EL display device as an example of the image display device according to the invention preferably has an aspect in which it has a light absorption anisotropic film, a λ/4 plate, and an organic EL display panel in this order from the visual recognition side.

More preferably, the organic EL display device has the above-described laminate having a λ/4 plate and an organic EL display panel in this order from the visual recognition side. In this case, the laminate has a base, an alignment film to be provided as necessary, a light absorption anisotropic film, and a λ/4 plate disposed in this order from the visual recognition side.

In addition, the organic EL display panel is a display panel configured using an organic EL element in which an organic light emitting layer (organic electroluminescence layer) is interposed between electrodes (between a cathode and an anode). The configuration of the organic EL display panel is not particularly limited, and a known configuration is employed.

EXAMPLES

Hereinafter, the invention will be more specifically described based on examples. Materials, used amounts, ratios, treatment contents, treatment procedures, and the like shown in the following examples are able to be properly changed without departing from the gist of the invention. Therefore, the range of the invention will not be restrictively interpreted by the following examples.

[Synthesis of Dichroic Dye Compound]

A dichroic dye compound used for coloring compositions of the examples and the comparative examples was synthesized by the following route.

<Dichroic Dye Compound D1>

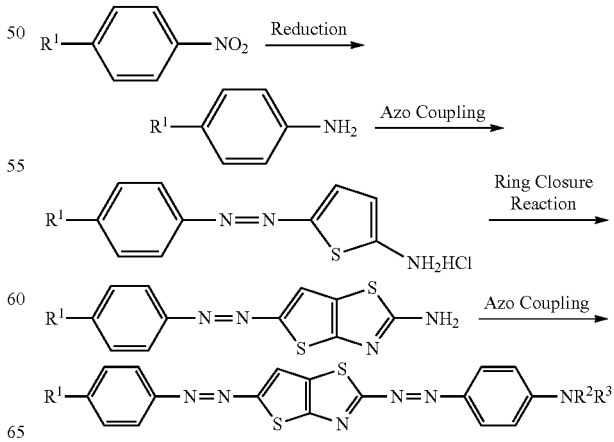

<Dichroic Dye Compound (D1)>

A dichroic dye compound (D1) was synthesized in accordance with the following steps.

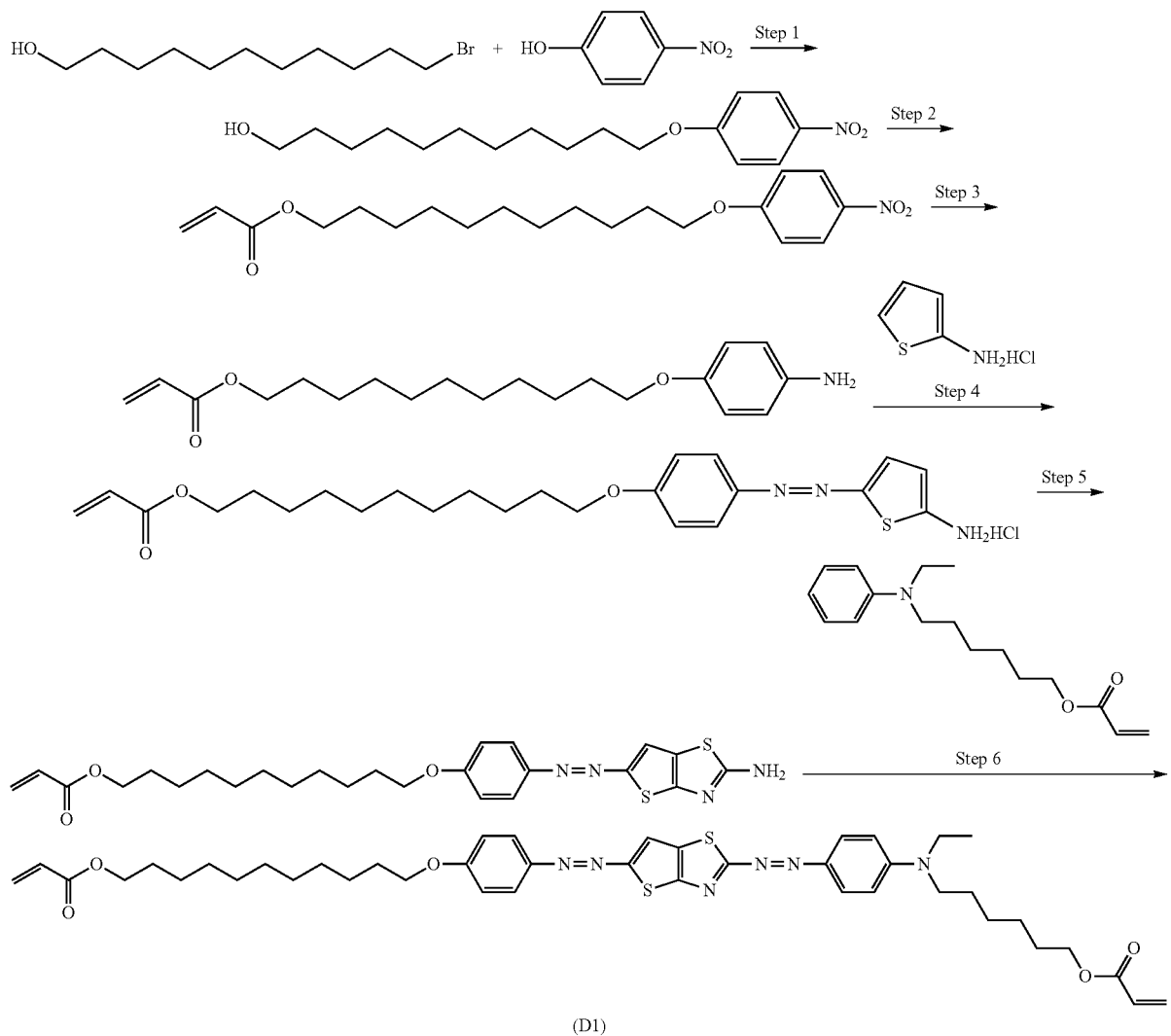

(D1)

(Steps 1 to 3)

27.8 g (200 mmol) of 4-nitrophenol, 50.2 g (200 mmol) of 11-bromoundecanol, and 30.4 g (220 mmol) of potassium carbonate were dissolved in 150 ml of N,N-dimethylacetamide (DMAc), and the obtained solution was stirred for 2 hours at an external temperature of 105° C. The temperature of the solution was lowered to the room temperature, and liquid separation and washing were performed with ethyl acetate and an aqueous solution of 10% ammonium chloride. The organic layer was dried with magnesium sulfate, and then concentrated to obtain a white solid.

Next, 150 ml of DMAc was added to the solid, and the obtained solution was stirred in an ice bath. The temperature of the reaction system was maintained at 15° C. or lower, and 18.1 g of acrylic acid chloride was added dropwise to the solution. After the dropwise addition, the solution was stirred for 1 hour at room temperature. Ethyl acetate and an aqueous solution of 10% ammonium chloride were added to the obtained solution to perform liquid separation and washing. After drying with magnesium sulfate, the organic layer was concentrated, and a yellow solid (A) was obtained.

Separately, 89.4 g (1.6 mol) of a Fe powder, 8.9 g (166 mmol) of ammonium chloride, 210 ml of 2-propanol, and 88 ml of water were mixed, and the obtained solution was refluxed at an external temperature of 105° C. To the system in which the reflux had been performed, the yellow solid (A) dissolved by heating in 88 ml of 2-propanol was added dropwise. After the dropwise addition was terminated, the obtained solution was reacted for 30 minutes under reflux. The temperature of the solution was lowered to the room temperature, and then the iron powder was removed by celite filtering. The filtrate was separated by ethyl acetate and water, and the organic layer was washed three times with water.

The organic layer was dried with sodium sulfate, and then concentrated. Purification was performed with columns, and 8.1 g of a target aniline derivative was obtained (yield of three steps: 12%).

NMR Data (DMSO-d6) δ: 1.20-1.38 (m, 14H), 1.50-1.70 (m, 4H), 4.20 (d, 2H), 3.80 (t, 2H), 4.00 (t, 2H), 4.50-4.70 (brs, 2H), 5.80-5.85 (d, 1H), 6.10-6.15 (dd, 1H), 6.38-6.43 (d, 1H), 6.50 (d, 2H), 6.60 (d, 2H)

(Step 4)

2-aminothiophene hydrochloride was synthesized from 2-nitrothiophene (manufactured by FUJIFILM Wako Pure Chemical Corporation) in accordance with a method described in the literature (Journal of Medicinal Chemistry, 2005, Vol. 48, page 5794).

6.0 g (17.9 mmol) of the aniline derivative obtained in the step 3 was added to a mixed liquid of 15 ml of 12 mol/L hydrochloric acid, 30 ml of water, and 30 ml of tetrahydrofuran (THF). Cooling was performed such that the internal temperature was 5° C. or lower, and to the obtained solution, a solution obtained by dissolving 1.4 g of sodium nitrite (manufactured by FUJIFILM Wako Pure Chemical Corporation) in 9 ml of water was added dropwise. The obtained solution was stirred for 1 hour at an internal temperature of 5° C. or lower, and a diazonium solution was prepared.

Next, to a solution obtained by dissolving 2.4 g (17.9 mmol) of 2-aminothiophene hydrochloride in 12 ml of water and 6 ml of a hydrochloric acid, the diazonium solution prepared as described above was added dropwise at an internal temperature of 0° C. The reaction liquid was heated to the room temperature and stirred for 2 hours.

The precipitated solid was filtered and dried, and 6.5 g of a target orange solid was obtained.

NMR Data (DMSO-d6) δ: 1.20-1.38 (m, 14H), 1.50-1.70 (m, 4H), 4.20 (d, 2H), 3.90 (t, 2H), 4.00 (t, 2H), 5.80-5.85 (d, 1H), 6.10-6.15 (dd, 1H), 6.38-6.43 (d, 1H), 6.78 (s, 1H), 7.00 (d, 2H), 7.42 (d, 2H), 7.85 (s, 1H)

(Step 5)

6.0 g (12.4 mmol) of the orange solid obtained in the step 4 was dissolved by suspension in 100 ml of an acetic acid, and 1.5 g (18.6 mmol) of sodium thiocyanate was added to the obtained solution at room temperature. The obtained solution was water-cooled, and 2.0 g (24.8 mmol) of bromine was added dropwise thereto while the internal temperature was maintained at 20° C. or lower.

The obtained solution was stirred for 2 hours at room temperature, and then 100 ml of water was added thereto. The obtained solid was filtered and dried, and 6.1 g of a target black solid was obtained.

NMR Data (DMSO-d6) δ: 1.20-1.38 (m, 14H), 1.50-1.70 (m, 4H), 4.00-4.20 (t×2, 4H), 5.90-5.95 (d, 1H), 6.10-6.15 (dd, 1H), 6.38-6.43 (d, 1H), 6.78 (s, 1H), 7.00 (d, 2H), 7.60-7.70 (d, 2H), 7.90 (s, 1H), 8.10 (brs, 2H)

(Step 6)

5.0 g (10.0 mmol) of the black solid obtained in the step 5 was added to 6 ml of a hydrochloric acid and 6 ml of an acetic acid, and 5 ml of an aqueous solution of 0.72 g (10.5 mmol) sodium nitrite was added dropwise to the obtained solution at 0° C. or lower under ice cooling. After stirring for 1 hour, 0.52 mg of an amidosulfuric acid was added, and a diazonium solution was obtained.

While 10 ml of a methanol solution of 2.8 g N-ethyl-N-(6-acryloyloxyhexyl)aniline was kept at 0° C. or lower, the diazonium solution was added dropwise thereto. The temperature of the obtained solution was raised to the room temperature, and stirring was performed for 1 hour. Then, 30 ml of water was added to filter the obtained solid. Purification was performed with columns, and 0.51 g of a compound of a dark purple solid represented by Formula (D1) was obtained.

N-ethyl-N-(6-acryloyloxyhexyl)aniline was synthesized in accordance with U.S. Pat. No. 7,601,849A and known methods using N-ethylaniline as a raw material.

NMR Data (CDCl₃) δ: 1.20-1.50 (m, 21H), 1.60-1.90 (m, 8H), 3.40 (t, 2H), 3.50 (t, 2H), 4.05 (t, 2H), 4.10 (t, 2H), 4.20 (t, 2H), 5.80-5.85 (d, 2H), 6.10-6.15 (dd, 2H), 6.38-6.43 (d×2, 2H), 6.70 (d, 2H), 7.00 (d, 2H), 7.82 (s, 1H), 7.88 (d, 2H), 7.95 (d, 2H)

<Dichroic Dye Compounds D2 to D14>

Dichroic dye compounds D2 to D14 were manufactured in the same manner as in the case of the dichroic dye compound D1.

Structures of the dichroic dye compounds D2 to D14 are shown as follows.

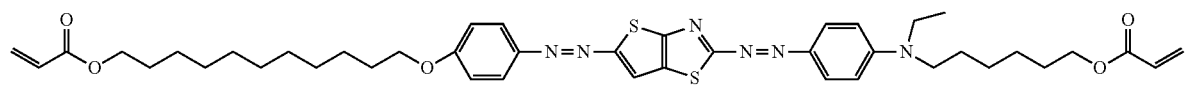

D1

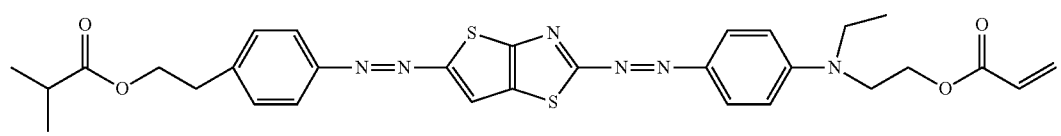

D2

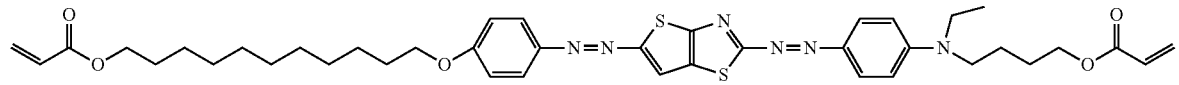

D3

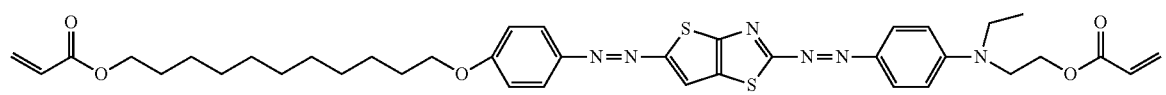

D4

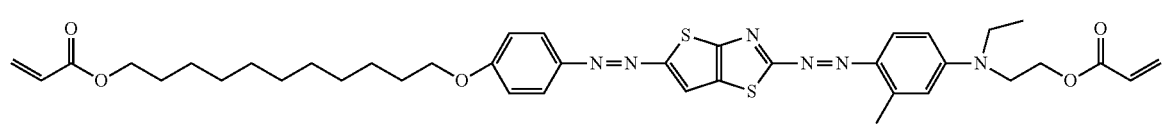

D5

-continued

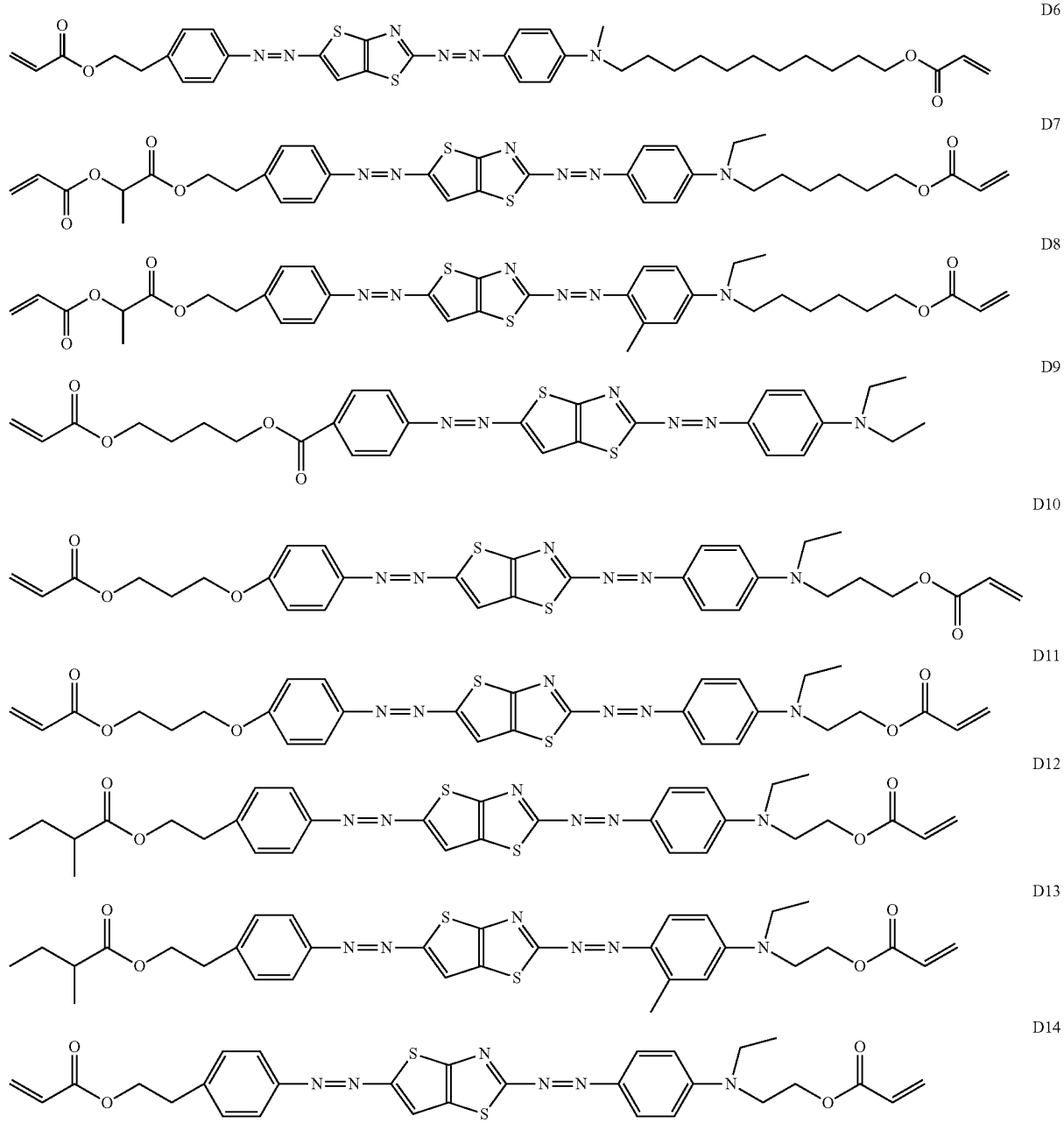

Example 1

A light absorption anisotropic film of Example 1 was produced by applying a coloring composition 1 (see Table 1 to be described later) to an alignment film PI produced as described above.

<Production of Alignment Film>

A glass base (manufactured by Central Glass Co., Ltd., blue plate glass, size: 300 mm×300 mm, thickness: 1.1 mm) was washed with an alkaline detergent, and then pure water was poured thereto. After that, the glass base was dried.

The following alignment film forming composition 1 was applied to the glass base after the drying using a bar #4, and the applied alignment film forming composition 1 was dried for 15 minutes at 80° C., and then heated for 1 hour at 250° C. to form a coating film on the glass base.

The obtained coating film was subjected to a rubbing treatment (number of rotations of roller: 1,000 rotations/2.6 mm of spacer thickness, stage speed: 1.8 m/min) once to form an alignment film PI on the glass base.

Composition of Alignment Film Forming Composition 1

| | |
|---|---|
| SE-130 (product name, manufactured by Nissan Chemical Industries, Ltd.) | 2.0 parts by mass |
| N-methylpyrrolidone | 98.0 parts by mass |

<Production of Light Absorption Anisotropic Film>

The obtained alignment film PI was spin-coated with a coloring composition 1 (see Table 1 to be described later) by using a spin coater at a rotation speed of 500 rotations/10 sec to form a coating film. The coating film was dried for 30 seconds at 25° C., and then heated for 15 seconds at 120° C. Next, the coating film was cooled to the room temperature, and then irradiation was performed thereon for 55 seconds using a high-pressure mercury lamp under an irradiation condition of 27 mW/cm² illuminance (irradiation under an environment of 25° C., irradiation dose: 1.5 J/cm²) to produce a light absorption anisotropic film of Example 1 on the alignment film PI.

Example 2

A light absorption anisotropic film of Example 2 was produced using a coloring composition 2 (see Table 1 to be described later) on an alignment film produced as described below.

<Production of Alignment Film>

A glass base (manufactured by Central Glass Co., Ltd., blue plate glass, size: 300 mm×300 mm, thickness: 1.1 mm) was washed with an alkaline detergent, and then pure water was poured thereto. After that, the glass base was dried.

The following alignment film forming composition 2 was applied to the glass base after the drying using a bar #12, and the applied alignment film forming composition 2 was dried for 2 minutes at 110° C. to form a coating film on the glass base.

The obtained coating film was subjected to a rubbing treatment (number of rotations of roller: 1,000 rotations/2.9 mm of spacer thickness, stage speed: 1.8 m/min) once to produce an alignment film PVA on the glass base.

Composition of Alignment Film Forming Composition 2

| | |
|---|---|
| Modified Vinyl Alcohol (see Formula (PVA-1)) | 2.00 parts by mass |
| Water | 74.08 parts by mass |
| Methanol | 23.86 parts by mass |
| Photopolymerization Initiator (IRGACURE 2959, manufactured by BASF SE) | 0.06 parts by mass |

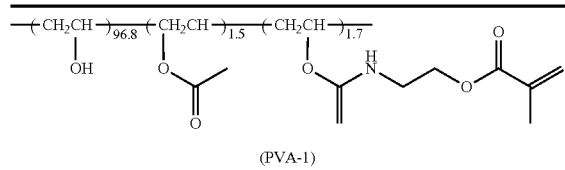

(PVA-1)

The numerical value assigned to the repeating unit in Formula (PVA-1) represents a molar ratio of each repeating unit.

<Production of Light Absorption Anisotropic Film>

The obtained alignment film PVA was spin-coated with a coloring composition 2 (see Table 1 to be described later) by using a spin coater at a rotation speed of 1,000 rotations/10 sec to form a coating film. The coating film was dried for 30 seconds at 25° C., and then heated for 15 seconds at 170° C. Next, the coating film was cooled to the room temperature, and then irradiation was performed thereon for 48 seconds using a high-pressure mercury lamp under an irradiation condition of 27 mW/cm² illuminance (irradiation under an environment of 60° C., irradiation dose: 1.3 J/cm²) to produce a light absorption anisotropic film of Example 2 on the alignment film PVA.

Examples 3 to 8 and Comparative Examples 1 and 2

A light absorption anisotropic film of Example 3 was produced in the same manner as in Example 2, except that a coloring composition 3 having a composition shown in Table 1 was used, and the exposure conditions (irradiation conditions) in the production of the light absorption anisotropic film were as shown in Table 1.

A light absorption anisotropic film of Example 4 was produced in the same manner as in Example 1, except that a coloring composition 4 having a composition shown in Table 1 was used, and the exposure conditions (irradiation conditions) in the production of the light absorption anisotropic film were as shown in Table 1.

A light absorption anisotropic film of Example 5 was produced in the same manner as in Example 2, except that a polyethylene terephthalate film (product name "COSMOSHINE", manufactured by TOYOBO CO., LTD., abbreviated as "PET" in the table) was used as a base, a coloring composition 5 having a composition shown in Table 1 was used, and the exposure conditions (irradiation conditions) in the production of the light absorption anisotropic film were as shown in Table 1.

A light absorption anisotropic film of Example 6 was produced in the same manner as in Example 2, except that a polyethylene terephthalate film was used as a base, a coloring composition 6 having a composition shown in Table 1 was used, and the exposure conditions (irradiation conditions) in the production of the light absorption anisotropic film were as shown in Table 1.

A light absorption anisotropic film of Example 7 was produced in the same manner as in Example 2, except that a coloring composition 7 having a composition shown in Table 1 was used, and the exposure conditions (irradiation conditions) in the production of the light absorption anisotropic film were as shown in Table 1.

A light absorption anisotropic film of Example 8 was produced in the same manner as in Example 2, except that a coloring composition 8 having a composition shown in Table 1 was used, and the exposure conditions (irradiation conditions) in the production of the light absorption anisotropic film were as shown in Table 1.

A light absorption anisotropic film of Comparative Example 1 was produced in the same manner as in Example 2, except that a polyethylene terephthalate film was used as a base, a coloring composition 9 having a composition shown in Table 1 was used, and the exposure conditions (irradiation conditions) in the production of the light absorption anisotropic film were as shown in Table 1.

A light absorption anisotropic film of Comparative Example 2 was produced in the same manner as in Example 2, except that a coloring composition 10 having a composition shown in Table 1 was used, and the exposure conditions (irradiation conditions) in the production of the light absorption anisotropic film were as shown in Table 1.

In Table 1, "CPO" means cyclopentanone. "Irg-819" means IRGACURE 819 (manufactured by BASF SE), and "OXE-01" means IRGACURE OXE-01 (manufactured by BASF SE).

Structures of liquid crystalline compounds L1 and L2 in Table 1 are shown as follows. A liquid crystalline compound L3 in Table 1 is a mixture obtained by mixing a liquid crystalline compound L3-1 having the following structure and a liquid crystalline compound L3-2 having the following structure such that the mass ratio (L3-1:L3-2) was 75:25.

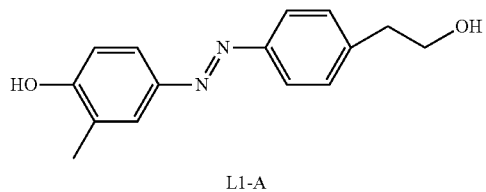

L1-A

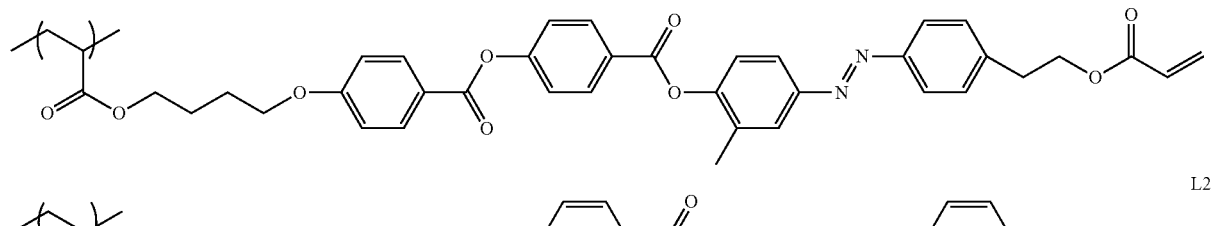

L1

L2

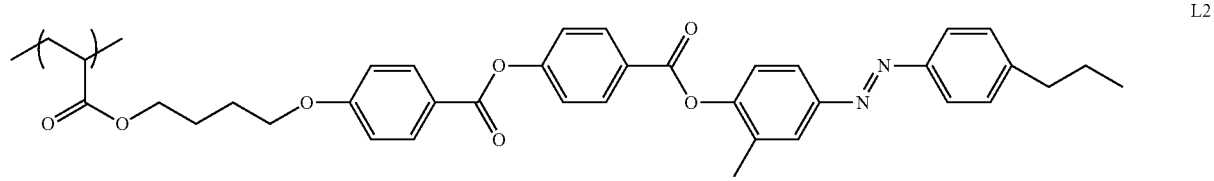

L3-1

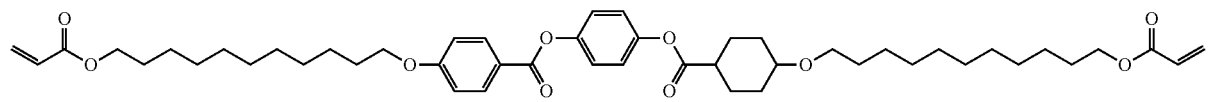

L3-2

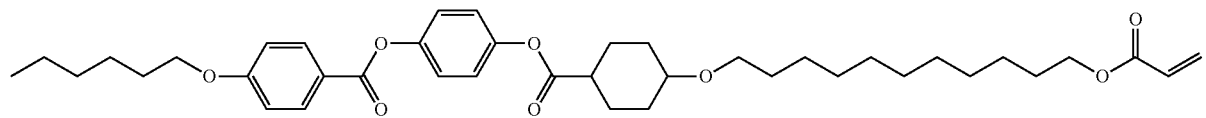

Here, the liquid crystalline compounds L1 and L2 were synthesized as follows.

<Synthesis of Liquid Crystalline Compound L1>

The liquid crystalline compounds L1 was synthesized in accordance with the following steps 1 to 3.

(Step 1)

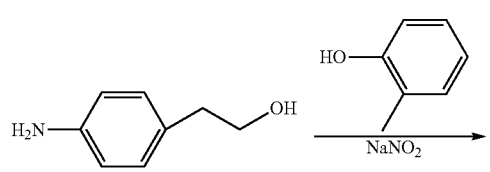

20 g of 4-(2-hydroxyethyl)aniline was dissolved in 37 mL of a concentrated hydrochloric acid and 300 mL of water, and stirred for 30 minutes at an external temperature of 0° C. The internal temperature was maintained at 10° C. or lower at an external temperature of 0° C., and to the obtained solution, a solution obtained by dissolving 10.4 g of sodium nitrite in 80 mL of water was added dropwise. Stirring was performed for 20 minutes at an internal temperature of 10° C. or lower, and a diazonium solution was prepared.

Next, 18.6 g of sodium hydroxide was dissolved in 500 mL of water, and to the obtained solution, 16.2 g of o-methylphenol was added dropwise and stirred for 10 minutes at an external temperature of 0° C. to prepare a coupler solution.

Next, the diazonium solution prepared as described above was added dropwise to the prepared coupler solution at an internal temperature maintained at 10° C. or lower. After the dropwise addition was terminated, the obtained solution was stirred for 1 hour at room temperature.

Next, using a diluted hydrochloric acid aqueous solution, neutralization was performed until the pH of the obtained solution was 8 to 9, and a solid was precipitated. The precipitated solid was filtered out and washed with water. Then, the solid was dried at 40° C., and 35 g of a yellow solid L1-A was obtained.

(Step 2)

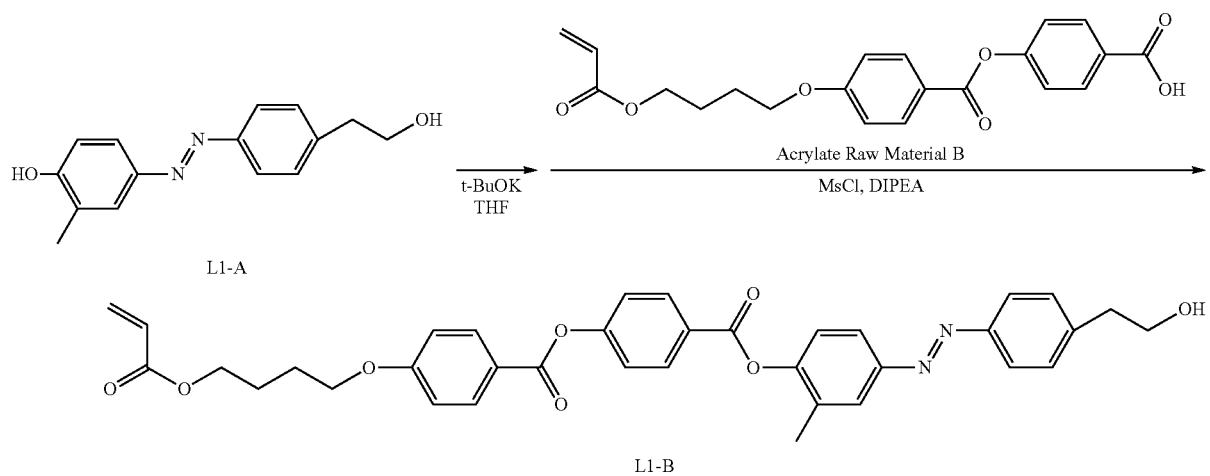

35 g of an acrylate raw material B was dissolved in 400 mL of a tetrahydrofuran (THF), and to the obtained solution, 10.66 g of methanesulfonyl chloride was added. The obtained solution was stirred for 5 minutes at an external temperature of 0° C., and 12.03 g of diisopropylethylamine was added dropwise at an internal temperature maintained at 10° C. or lower. The obtained solution was stirred for 30 minutes at an internal temperature of 10° C. or lower, and an acrylate raw material solution was prepared.

Next, 11.36 g of t-butoxy potassium and 200 mL of THF were stirred at an external temperature of 0° C., and to the obtained solution, a solution obtained by dissolving 19.88 g of the yellow solid L1-A in 200 mL of THF was added dropwise at an internal temperature maintained at 10° C. or lower. The reaction liquid was stirred for 1 hour at room temperature. Then, 100 mL of methanol and 1,000 mL of water were added for crystallization. The obtained solid was dissolved in 500 mL of ethyl acetate at an external temperature of 80° C., 550 mL of n-hexane was added, and the temperature was lowered to the room temperature to precipitate a solid. The obtained solid was washed with n-hexane and dried at room temperature, and thus 32 g of a yellow solid L1-B was obtained.

(Step 3)

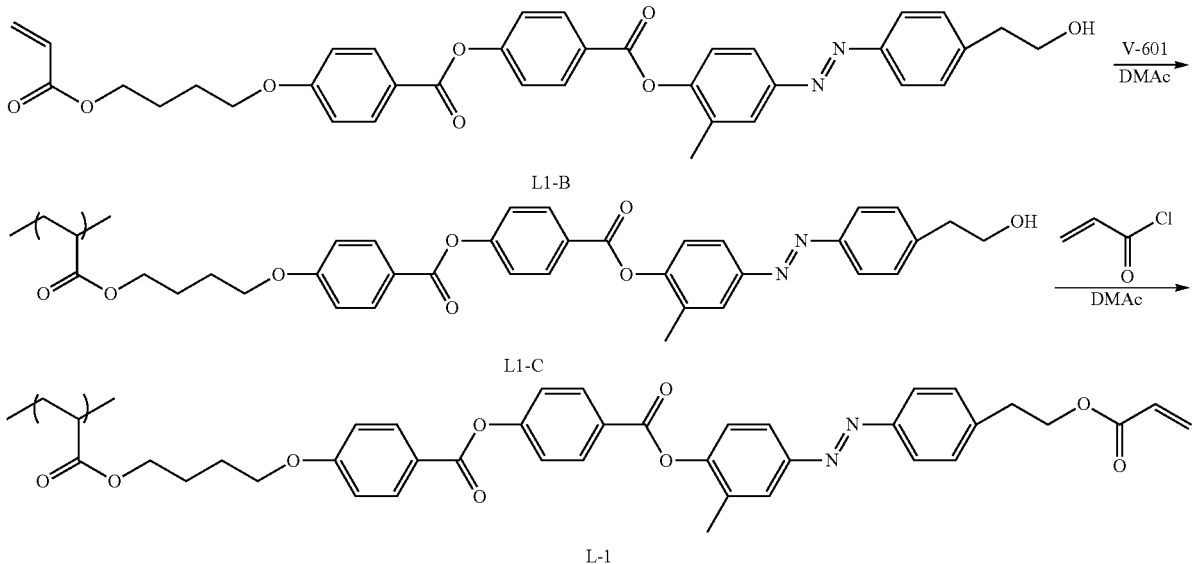

31.13 g of the yellow solid L1-B was dissolved in 125 mL of dimethylacetamide, and the obtained solution was stirred for 1 hour with nitrogen flowing thereto. The obtained solution was heated at an external temperature of 90° C., and 0.52 g of a polymerization initiator V-601 and 10 mL of a dimethylacetamide solution were added thereto and heated for 2 hours. The addition of the polymerization initiator and the heating for 2 hours at an external temperature of 90° C. were repeated two times to polymerize the yellow solid L1-B. After the end of the reaction, the reaction liquid was heated for 2 hours at 100° C. Then, the internal temperature was lowered to 60° C., and 125 mL of dimethylacetamide was added.

Next, the reaction liquid was cooled at an external temperature of 0° C., 0.2 g of 2,6-di-t-butyl-4-methylphenol was added, and 45.6 g of acrylic acid chloride was added dropwise at an internal temperature maintained at 15° C. or lower. After the reaction for 2 hours at room temperature, 500 mL of ethyl acetate was added to the reaction liquid, and the obtained solution was added dropwise to 2,000 mL of methanol to precipitate a polymer solid. The polymer solid which had been filtered out was washed with methanol and dried at room temperature, and 31.6 g of a liquid crystalline compound L1 of a yellow solid was obtained. The obtained liquid crystalline compound L1 was analyzed by gel permeation chromatography (GPC). The number average molecular weight (Mn) was 9,000, and the weight average molecular weight (Mw) was 19,000 (all in terms of polystyrene).

<Synthesis of Liquid Crystalline Compound L2>

A liquid crystalline compound L2 was synthesized in accordance with the following steps 1 to 3.

(Step 1)

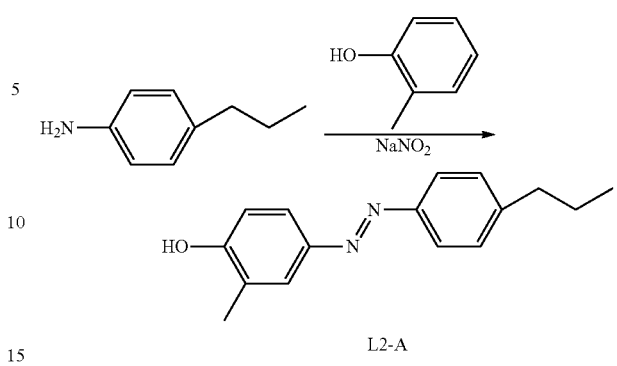

A yellow solid L2-A was synthesized in the same manner as in the synthesis of the yellow solid L1-A, except that 4-(2-hydroxyethyl)aniline as a raw material was changed to 4-propylaniline.

(Step 2)

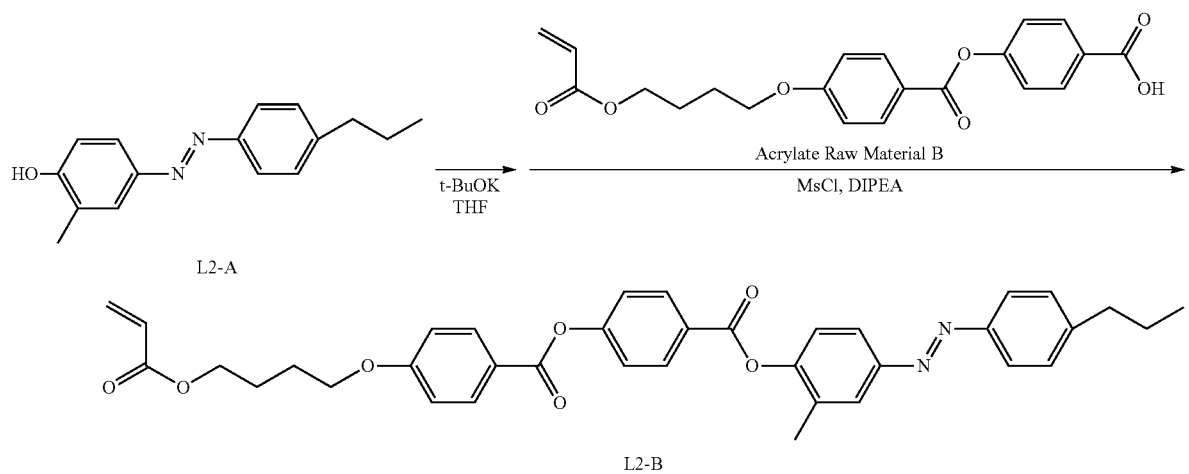

A yellow solid L2-B was synthesized in the same manner as in the synthesis of the yellow solid L1-B, except that the yellow solid L1-A as a raw material was changed to the yellow solid L2-A.

(Step 3)

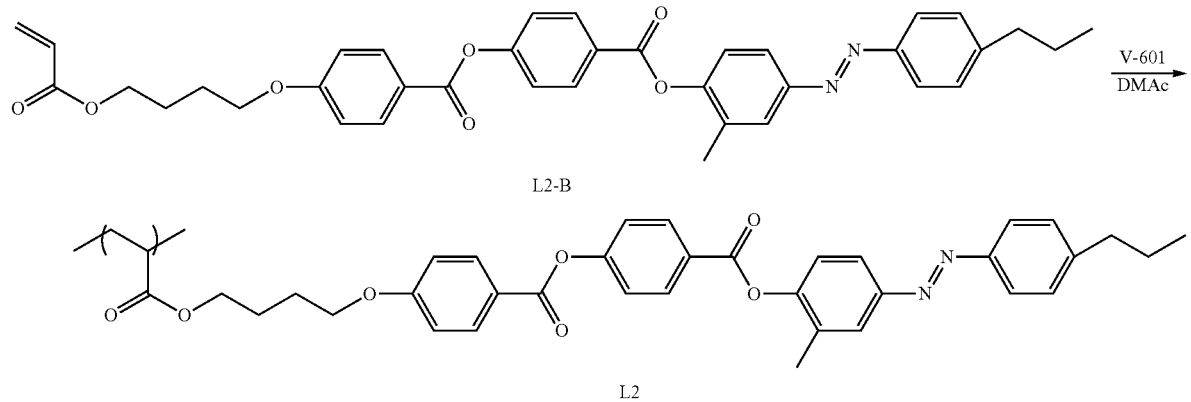

30 g of the yellow solid L2-B was dissolved in 120 mL of dimethylacetamide, and the obtained solution was stirred for 1 hour with nitrogen flowing thereto. The obtained solution was heated at an external temperature of 90° C., and 0.60 g of a polymerization initiator V-601 and 10 mL of a dimethylacetamide solution were added thereto and heated for 2 hours. The addition of the polymerization initiator and the heating for 2 hours at an external temperature of 90° C. were repeated two times to polymerize the yellow solid L2-B. After the end of the reaction, the reaction liquid was heated for 2 hours at 100° C. Then, the internal temperature was lowered to 60° C., and 150 mL of ethyl acetate was added to the reaction liquid. The obtained solution was added dropwise to 2,000 mL of methanol to precipitate a polymer solid. The polymer solid which had been filtered out was washed with methanol and dried at room temperature, and 29 g of a liquid crystalline compound L2 of a yellow solid was obtained. The obtained liquid crystalline compound L2 was analyzed by gel permeation chromatography (GPC). The number average molecular weight (Mn) was 6,600, and the weight average molecular weight (Mw) was 14,000 (all in terms of polystyrene).

A structure of an interface improver F1 in Table 1 is shown as follows.

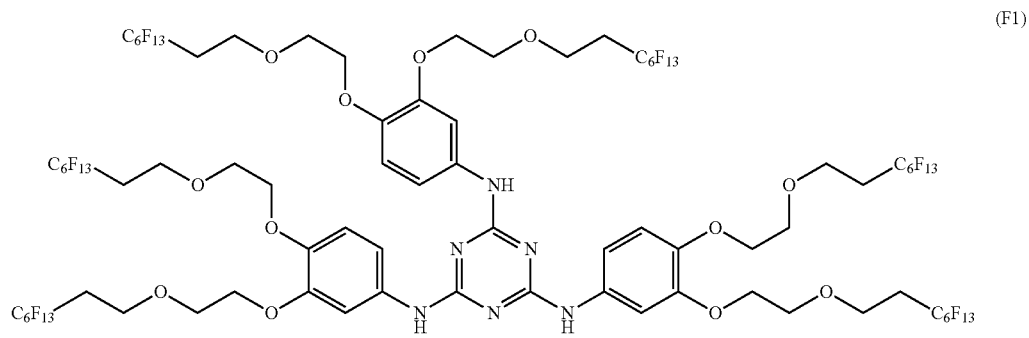

(F1)

[Evaluation Test]
<Measurement of Reaction Rate of Dichroic Dye Compound>

The light absorption anisotropic film of each of the examples and the comparative examples was cut into a size of 1 cm×1 cm, and extracted with 1 ml of tetrahydrofuran. The extraction liquid was analyzed by high-performance liquid chromatography (HPLC, manufactured by TOSOH CORPORATION, ODS-80 Ts), and thus an area value (A1) of the unreacted dichroic dye compound was obtained. Similarly, the light absorption anisotropic film in an unexposed state was analyzed by HPLC, and an area value (A0) of the unreacted dichroic dye compound was obtained. The reaction rates of the dichroic dye compound before and after the exposure were calculated in accordance with the following formula. In a case where two or more kinds of dichroic dye compounds were contained, the reaction rates were calculated for each kind. The evaluation results are shown in the following Table 1.

Reaction Rate (%)=[($A0-A1$)/$A0$]×100

[Evaluation Results]
The results of the above evaluation are shown in Table 1.

TABLE 1

|  |  | Example 1 | Example 2 | Example 3 | Example 4 | Example 5 | Example 6 |
| --- | --- | --- | --- | --- | --- | --- | --- |
| Kind of Coloring Composition |  | Coloring Composition 1 | Coloring Composition 2 | Coloring Composition 3 | Coloring Composition 4 | Coloring Composition 5 | Coloring Composition 6 |
| Base |  | Glass | Glass | Glass | Glass | PET | PET |
| Alignment Film |  | PI | PVA | PVA | PI | PVA | PVA |
| Composition of Coloring Composition | Liquid Crystalline Compound | L1 | L1 | L1 | L2 | L3 | L2 |
|  | Parts by Mass | 3.75 | 3.21 | 2.78 | 3.21 | 2.78 | 3.75 |
|  | Dichroic Dye Compound Dye 1 | D1 | D3 | D4 | D6 | D4 | D7 |
|  | Parts by Mass | 1.24 | 1.73 | 0.92 | 1.73 | 0.92 | 1.24 |

TABLE 1-continued

|  |  | | | | | |
|---|---|---|---|---|---|---|
|  | Dye 2 | D2 |  | D5 | D5 | D8 |
|  | Parts by Mass | 1.70 |  | 1.27 | 1.27 | 1.71 |
|  | Polymerization Initiator | Irg-819 | Irg-819 | Irg-819 | Irg-819 | Irg-819 | Irg-819 |
|  | Parts by Mass | 0.28 | 0.24 | 0.21 | 0.24 | 0.21 | 0.28 |
|  | Interface Improver | F1 | F1 | F1 | F1 | F1 | F1 |
|  | Parts by Mass | 0.03 | 0.02 | 0.02 | 0.02 | 0.02 | 0.02 |
|  | Solvent | CPO | Chloroform | Chloroform | Chloroform | Chloroform | CPO |
|  | Parts by Mass | 93.00 | 94.80 | 94.80 | 94.80 | 94.80 | 93.00 |
| Exposure Conditions | Irradiation Dose (J/cm$^2$) | 1.5 | 1.3 | 1.5 | 1.3 | 1.5 | 1.5 |
|  | Temperature (° C.) | 25 | 60 | 60 | 60 | 80 | 80 |
| Evaluation Results (reaction rate) | Dye 1 | 60 | 65 | 60 | 45 | 60 | 15 |
|  | Dye 2 | 45 | — | 60 | — | 60 | 20 |

|  |  | Example 7 | Example 8 | Comparative Example 1 | Comparative Example 2 |
|---|---|---|---|---|---|
|  | Kind of Coloring Composition | Coloring Composition 7 | Coloring Composition 8 | Coloring Composition 9 | Coloring Composition 10 |
| Base |  | Glass | Glass | PET | Glass |
| Alignment Film |  | PVA | PVA | PVA | PVA |
| Composition of Coloring Composition | Liquid Crystalline Compound | L1 | L1 | L1 | L1 |
|  | Parts by Mass | 3.21 | 2.78 | 3.75 | 2.78 |
|  | Dichroic Dye Compound Dye 1 |  | D10 | D12 | D14 |
|  | Parts by Mass |  | 0.92 | 1.24 | 0.92 |
|  | Dye 2 | D9 | D11 | D13 | D2 |
|  | Parts by Mass | 1.73 | 1.27 | 1.70 | 1.27 |
|  | Polymerization Initiator | OXE-01 | OXE-01 | Irg-819 | Irg-819 |
|  | Parts by Mass | 0.24 | 0.21 | 0.28 | 0.21 |
|  | Interface Improver | F1 | F1 | F1 | F1 |
|  | Parts by Mass | 0.02 | 0.02 | 0.03 | 0.02 |
|  | Solvent | Chloroform | Chloroform | CPO | Chloroform |
|  | Parts by Mass | 94.80 | 94.80 | 93.00 | 94.80 |
| Exposure Conditions | Irradiation Dose (J/cm$^2$) | 1.5 | 1.5 | 1.5 | 1.5 |
|  | Temperature (° C.) | 80 | 80 | 80 | 80 |
| Evaluation Results (reaction rate) | Dye 1 |  | 2 | 0 | 0 |
|  | Dye 2 | 5 | 1 | 0 | 0 |

As shown in Table 1, it has been found that in a case where a coloring composition containing a dichroic dye compound having a structure represented by Formula (1D) is used, the dichroic dye compound contained in the light absorption anisotropic film is reacted (polymerized) (Examples 1 to 8). From this result, it is presumed that the curability of the coloring composition is improved, and thus the light absorption anisotropic film has excellent durability.

The coloring composition of Example 1 contains the dichroic dye compound D2 (the number of atoms of a main chain of each of M$^1$ and M$^2$ in Formula (1D) is smaller than 4) not corresponding to Formula (1D). In Example 1, the dichroic dye compound D2 having less reactivity is thought to be polymerized due to the action of the dichroic dye compound D1 having a structure represented by Formula (1D).

In addition, from the comparison between Examples 1 to 8, it has been found that in a case where the number of atoms of a main chain of at least one of M$^1$ or M$^2$ in Formula (1D) is 7 or more, the dichroic dye compound contained in the light absorption anisotropic film is further reacted (polymerized) (Examples 1 to 7).

In Comparative Examples 1 and 2, it has been found that since the number of atoms of a main chain of each of M$^1$ and M$^2$ in Formula (1D) is smaller than 4, the dichroic dye compound contained in the light absorption anisotropic film is not completely reacted (polymerized). From this result, it is presumed that the curability of the coloring composition is not sufficient, and thus the durability of the light absorption anisotropic film deteriorates.

Example 9

An alignment film PVA used in Example 2 was spin-coated with a coloring composition 11 having the following composition by using a spin coater at a rotation speed of 1,000 rotations/10 sec to form a coating film. The coating film was dried for 30 seconds at 25° C., and then heated for 15 seconds at 130° C. Next, the coating film was cooled to the room temperature, and a light absorption anisotropic film was obtained. The obtained light absorption anisotropic film was extracted with tetrahydrofuran, and the remaining film was transparent.

On a light absorption anisotropic film obtained in the same manner, irradiation was performed for 60 seconds using a high-pressure mercury lamp under an irradiation condition of 27 mW/cm$^2$ illuminance (irradiation under an environment of 60° C., irradiation dose: 1.6 J/cm$^2$). The light absorption anisotropic film after the irradiation was extracted with tetrahydrofuran, and it was confirmed that the remaining film was gray and the dichroic dye compound was cured.

Composition of Coloring Composition 11

| | |
|---|---|
| Liquid Crystalline Compound L1 (see Formula (L1)) | 2.36 parts by mass |
| Dichroic Dye Compound D4 (see Formula (D4)) | 1.06 parts by mass |
| Dichroic Dye Compound D5 (see Formula (D5)) | 0.78 parts by mass |
| Dichroic Dye Compound D15 (see Formula (D15)) | 0.80 parts by mass |
| Photopolymerization Initiator (IRGACURE 819, manufactured by BASF SE) | 0.18 parts by mass |
| Interface Improver F1 (see Formula (F1)) | 0.02 parts by mass |
| Chloroform (solvent) | 94.80 parts by mass |

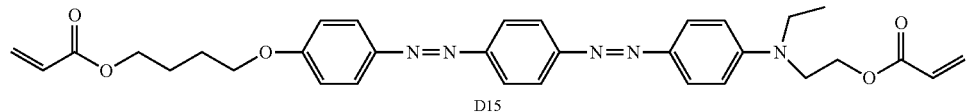

D15

Example 10

An alignment film PI produced in Example 1 was spin-coated with the coloring composition 11 by using a spin coater at a rotation speed of 1,000 rotations/10 sec to form a coating film. The coating film was dried for 30 seconds at 25° C., and then heated for 15 seconds at 130° C. Next, the coating film was cooled to the room temperature, and a light absorption anisotropic film was obtained. Irradiation was performed on the obtained light absorption anisotropic film for 60 seconds using a high-pressure mercury lamp under an irradiation condition of 27 mW/cm² illuminance (irradiation under an environment of 60° C., irradiation dose: 1.6 J/cm²).

Example 11

A light absorption anisotropic film obtained in the same manner as in Example 10 was spin-coated with the following oxygen shielding layer forming composition 1 by using a spin coater at a rotation speed of 1,000 rotations/10 sec to form a coating film. Then, the coating film was dried for 2 minutes at 110° C., and a laminate in which an oxygen shielding layer was formed on the light absorption anisotropic film was produced.

Composition of Oxygen Shielding Layer Forming Composition 1

| | |
|---|---|
| Modified Vinyl Alcohol (see Formula (PVA-1)) | 7.00 parts by mass |
| Water | 72.00 parts by mass |
| Isopropyl Alcohol | 21.00 parts by mass |

Example 12

A light absorption anisotropic film produced in the same manner as in Example 10 was installed in a vacuum film forming device, and an oxygen shielding layer formed of a silicon oxide represented by SiOxCy with a thickness of 20 nm was formed on a surface of the light absorption anisotropic film by a plasma CVD method under the following conditions to produce a laminate in which the oxygen shielding layer was formed on the light absorption anisotropic film.

Gas to be Used: Mixed gas of 5 sccm of hexamethyldisiloxane (HMDOS) and 50 sccm of oxygen
Frequency to be Applied: 13.56 MHz
Electricity to be Applied: 0.5 kW The laminates produced in Example 10 to 12 were heated for 2 hours at 235° C. In the laminate produced in each of Examples 11 and 12 in which the oxygen shielding layer was formed on the light absorption anisotropic film, the reduction of the polarization degree was more suppressed than in the laminate produced in Example 10.

What is claimed is:

1. A coloring composition comprising:
A dichroic dye compound having a structure represented by Formula (1D); and
a liquid crystalline compound, wherein

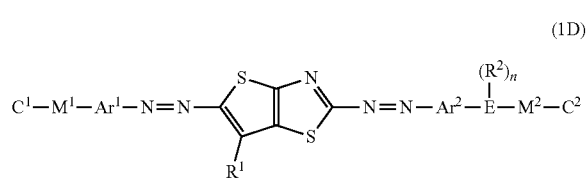

(1D)

in Formula (1D), $C^1$ and $C^2$ each independently represent a monovalent substituent, and at least one of $C^1$ and $C^2$ represents a crosslinkable group, in Formula (1D), $M^1$ represents —O—, —S—, —O—CO—O—, —CO—$NR^N$—, —O—$CONR^N$—, —$SO_2$—, —SO—, an alkylene group, a cycloalkylene group, an alkenylene group, and a group obtained by combining two or more of the above groups, $R^N$ represents a hydrogen atom or an alkyl group, $M^2$ represents a divalent linking group, and in at least one of $M^1$ and $M^2$, the number of atoms of a main chain is 4 or more, in Formula (1D), $Ar^1$ and $Ar^2$ each independently represent any one of a phenylene group which may have a substituent, a naphthylene group which may have a substituent, and a biphenylene group which may have a substituent, in Formula (1D), E represents any one of a nitrogen atom, an oxygen atom, and a sulfur atom, in Formula (1D), $R^1$ represents a hydrogen atom or a substituent, in Formula (1D), $R^2$ represents a hydrogen atom or an alkyl group which may have a substituent, in Formula (1D), n represents 0 or 1, such that in a case where E is a nitrogen atom, n is 1, and in a case where E is an oxygen atom or a sulfur atom, n is 0, in Formula (1D), at least one of the following Condition 1 and Condition 2 is satisfied, Condition 1: $C^1$ is a crosslinkable group, and the number of atoms of a main chain of $M^1$ is 4 or more, Condition 2: $C^2$ is a crosslinkable group, and the number of atoms of a main chain of $M^2$ is 4 or more, the liquid crystalline compound is a high-molecular-weight liquid crystalline compound having a repeating unit represented by Formula (1), or both a repeating unit represented by Formula (2) and a repeating unit represented by Formula (3),

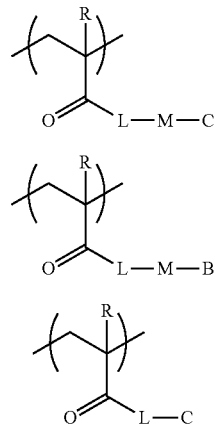

in Formula (1), Formula (2) and Formula (3), R represents a hydrogen atom or a methyl group, L represents a single bond or a divalent linking group, B represents a hydrogen atom, a halogen atom, a cyano group, an alkyl group, an alkoxy group, an amino group, an oxycarbonyl group, an acyloxy group, an acylamino group, an alkoxycarbonylamino group, a sulfonylamino group, a sulfamoyl group, a carbamoyl group, an alkylthio group, a sulfonyl group, a sulfinyl group, or a ureido group, C represents a crosslinkable group, and M represents a mesogenic group, the crosslinkable group is an acryloyl group or a methacryloyl group, and the dichroic dye compound and the liquid crystalline compound are aligned at a high alignment degree.

2. The coloring composition according to claim 1, wherein in Formula (1D), the number of atoms of a main chain of at least one of $M^1$ and $M^2$ is 7 or more.

3. The coloring composition according to claim 2, wherein in Formula (1D), both $C^1$ and $C^2$ are crosslinkable groups.

4. A light absorption anisotropic film which is formed using the coloring composition according to claim 2.

5. The coloring composition according to claim 1, wherein in Formula (1D), both $C^1$ and $C^2$ are crosslinkable groups.

6. A light absorption anisotropic film which is formed using the coloring composition according to claim 5.

7. A light absorption anisotropic film which is formed using the coloring composition according to claim 1.

8. A laminate comprising:
a base; and
the light absorption anisotropic film according to claim 7 which is formed on the base.

9. The laminate according to claim 8, further comprising:
a λ/4 plate which is formed on the light absorption anisotropic film.

10. An image display device comprising:
the laminate according to claim 9.

11. The laminate according to claim 8, further comprising:
an oxygen shielding layer which is formed on the light absorption anisotropic film.

12. An image display device comprising:
the laminate according to claim 11.

13. An image display device comprising:
the laminate according to claim 8.

14. An image display device comprising:
the light absorption anisotropic film according to claim 7.

* * * * *